(12) United States Patent
Miller

(10) Patent No.: US 7,643,685 B2
(45) Date of Patent: *Jan. 5, 2010

(54) VIEWPOINT-INVARIANT IMAGE MATCHING AND GENERATION OF THREE-DIMENSIONAL MODELS FROM TWO-DIMENSIONAL IMAGERY

(75) Inventor: Michael Miller, Jackson, NH (US)

(73) Assignee: Animetrics Inc., Conway, NH (US)

( * ) Notice: Subject to any disclaimer, the term of this patent is extended or adjusted under 35 U.S.C. 154(b) by 441 days.

This patent is subject to a terminal disclaimer.

(21) Appl. No.: 10/794,353

(22) Filed: Mar. 5, 2004

(65) Prior Publication Data

US 2004/0175039 A1    Sep. 9, 2004

Related U.S. Application Data

(60) Provisional application No. 60/452,429, filed on Mar. 6, 2003, provisional application No. 60/452,430, filed on Mar. 6, 2003, provisional application No. 60/452,431, filed on Mar. 6, 2003.

(51) Int. Cl.
*G06K 9/62* (2006.01)
(52) U.S. Cl. .................. 382/209; 299/1.4; 382/261
(58) Field of Classification Search ................ 382/154, 382/285
See application file for complete search history.

(56) References Cited

U.S. PATENT DOCUMENTS 5,159,361 A * 10/1992 Cambier et al. ............. 351/212
5,742,291 A    4/1998 Palm
5,825,936 A * 10/1998 Clarke et al. ................ 382/261
5,844,573 A   12/1998 Poggio et al.
5,898,438 A *  4/1999 Stewart et al. .............. 345/419
5,990,901 A   11/1999 Lawton et al.
6,094,199 A *  7/2000 Turkiyyah et al. .......... 345/419
6,226,418 B1   5/2001 Miller et al.
6,249,600 B1   6/2001 Reed et al.
6,296,317 B1 * 10/2001 Ollis et al. ................... 299/1.4
6,362,833 B2   3/2002 Trika
6,381,346 B1   4/2002 Eraslan
6,434,278 B1   8/2002 Hashimoto
6,529,626 B1   3/2003 Watanabe et al.

(Continued)

FOREIGN PATENT DOCUMENTS

EP    1 039 417    9/2000

(Continued)

OTHER PUBLICATIONS

Weisstein, "Matrix Norm," Dec. 22, 2003, http://mathworld.wolfram.com/MatrixNorm.html (2 pages).

(Continued)

*Primary Examiner*—Samir A. Ahmed
*Assistant Examiner*—Tsung-Yin Tsai
(74) *Attorney, Agent, or Firm*—Wilmer Cutler Pickering Hale and Dorr LLP

(57) ABSTRACT

A method and system for characterizing features in a source multifeatured three-dimensional object, and for locating a best-matching three-dimensional object from a reference database of such objects by performing a viewpoint invariant search among the reference objects. The invention further includes the creation of a three-dimensional representation of the source object by deforming a reference object.

48 Claims, 6 Drawing Sheets

U.S. PATENT DOCUMENTS

| | | | |
|---|---|---|---|
| 6,532,011 | B1 | 3/2003 | Francini et al. |
| 6,556,196 | B1 | 4/2003 | Blanz et al. |
| 7,340,159 | B2 | 3/2008 | Sugiura et al. |
| 2001/0033685 | A1 | 10/2001 | Ishiyama |
| 2002/0012454 | A1 | 1/2002 | Liu et al. |
| 2002/0106114 | A1 | 8/2002 | Yan et al. |
| 2003/0099409 | A1 | 5/2003 | Rowe |
| 2003/0123713 | A1 | 7/2003 | Geng |
| 2003/0169906 | A1 | 9/2003 | Gokturk et al. |

FOREIGN PATENT DOCUMENTS

| | | |
|---|---|---|
| EP | 1 143 375 | 10/2001 |
| EP | 1 204 069 | 5/2002 |
| WO | 01/63560 | 8/2001 |

OTHER PUBLICATIONS

Weisstein, "Projective Geometry," Dec. 22, 2003, http://mathworld.wolfram.com/ProjectiveGeometry.html (3 pages).

Eriksson et al., "Towards 3-dimensional face recognition," *IEEE Cape Town*, (Sep. 28, 1999), pp. 401-406.

Hsu et al., "Face modeling for recognition," *Proceedings 2001 International Conference on Image Processing*, vol. 1 (Oct. 7, 2001), pp. 693-696.

International Search Report for PCT/US2004/006604, Sep. 2, 2004; 18 pages.

International Search Report for PCT/US2004/006614, Aug. 26, 2004; 15 pages.

International Search Report for PCT/US2004/006827, Aug. 26, 2004; 15 pages.

Lanitis et al., "Toward Automatic Simulation of Aging Effects on Face Images," *IEEE Transactions on Pattern Analysis and Machine Intelligence*, vol. 24, No. 4 (Apr. 2002), pp. 442-455.

Lee et al., "3-D deformable face model for pose determination and face synthesis," *IEEE Computer Society*, (Sep. 27, 1999) pp. 260-265.

Lopez et al., "3D head pose computation from 2D images: templates versus features," *IEEE Computer Society*, vol. 3 (Oct. 23, 1995), pp. 599-602.

Pighin et al., "Synthesizing realistic facial expressions from photographs," *Computer Graphics Conference Proceedings*, (Jul. 19, 1998), pp. 75-84.

Tang et al., "Face recognition using synthesized intermediate views," *Proceedings of the 28$^{th}$ Midwest Symposium in Rio de Janeiro, Brazil*, (Aug. 13, 1995), pp. 1066-1069.

Rein-Lien Hsu et al., "Face modeling for recognition" Proceedings 2001 International Conference on Image Processing. ICIP 2001. Thessaloniki, Greece, Oct. 7-10, 2001, International Conference on Image Processing, New York, NY: IEEE, US, vol. vol. 1 of 3. Conf. 8, Oct. 7, 2001, pp. 693-696, XP010563858 ISBN: 0-7803-6725-1.

Li-An Tang et al., "Face recognition using synthesized intermediate views" Circuits and Systems, 1995., Proceedings., Proceedings of the 38th Midwest Symposium on Rio De Janeiro, Brazil Aug. 13-16, 1995, New York, NY USA, IEEE, US, Aug. 13, 1995, pp. 1066-1069, XP010165313 ISBN: 0-7803-2972-4.

European Patent Office, Communication Pursuant to Article 96(2) EPC, Sep. 21, 2007.

\* cited by examiner

VIEWPOINT-INVARIANT IMAGE MATCHING AND GENERATION OF THREE-DIMENSIONAL MODELS FROM TWO-DIMENSIONAL IMAGERY

RELATED APPLICATIONS

This application claims priority to and the benefits of U.S. Provisional Applications Ser. Nos. 60/452,429, 60/452,430 and 60/452,431 filed on Mar. 6, 2003 (the entire disclosures of which are hereby incorporated by reference).

FIELD OF THE INVENTION

The present invention relates to object modeling and matching systems, and more particularly to the generation of a three-dimensional model of a target object from two- and three-dimensional input.

BACKGROUND OF THE INVENTION

In many situations, it is useful to construct a three-dimensional (3D) model of an object when only a partial description of the object is available. In a typical situation, one or more two-dimensional (2D) images of the 3D object may be available, perhaps photographs taken from different viewpoints. A common method of creating a 3D model of a multi-featured object is to start with a base 3D model which describes a generic or typical example of the type of object being modeled, and then to add texture to the model using one or more 2D images of the object. For example, if the multi-featured object is a human face, a 3D "avatar" (i.e., an electronic 3D graphical or pictorial representation) would be generated by using a pre-existing, standard 3D model of a human face, and mapping onto the model a texture from one or more 2D images of the face. See U.S. Pat. No. 6,532,011 B1 to Francini et al., and U.S. Pat. No. 6,434,278 B1 to Hashimoto. The main problem with this approach is that the 3D geometry is not highly defined or tuned for the actual target object which is being generated.

A common variant of the above approach is to use a set of 3D base models and select the one that most resembles the target object before performing the texture mapping step. Alternatively, a single parameterized base model is used, and the parameters of the model are adjusted to best approximate to the target. See U.S. Pat. No. 6,556,196 B1 to Blanz et al. These methods serve to refine the geometry to make it fit the target, at least to some extent. However, for any target object with a reasonable range of intrinsic variability, the geometry of the model will still not be well tuned to the target. This lack of geometric fit will detract from the verisimilitude of the 3D model to the target object.

Conventional techniques typically also require that the 2D images being used for texturing the model be acquired from known viewpoints relative to the 3D object being modeled. This usually limits the use of such approaches to situations where the model is being generated in a controlled environment in which the target object can be photographed. Alternatively, resort may be had to human intervention to align 2D images to the 3D model to be generated. See U.S. Patent Publication No. 2002/0012454 to Liu et al. This manual step places a severe limit on the speed with which a 3D model can be generated from 2D imagery.

Accordingly, a need exists for an automated approach that systematically makes use of available 2D source data for a 3D object to synthesize an optimal 3D model of the object.

SUMMARY OF THE INVENTION

The present invention provides an automated method and system for generating an optimal 3D model of a target multifeatured object when only partial source data describing the object is available. The partial source data often consists of one or more 2D projections of the target object or an obscuration of a single projection, but may also include 3D data, such as from a 3D camera or scanner. The invention uses a set of reference 3D representations that span, to the extent practicable, the variations of the class of objects to which the target object belongs. The invention may automatically identify feature items common to the source data and to the reference representations, and establish correspondences between them. For example, if the target object is a face, the system may identify points at the extremities of the eyes and mouth, or the nose profile, and establish correspondences between such features in the source data and in the reference representations. Manual identification and matching of feature items can also be incorporated if desired. Next, all possible positions (i.e., orientations and translations) for each 3D reference representation are searched to identify the position and reference representation combination whose projection most closely matches the source data. The closeness of match is determined by a measure such as the minimum mean-squared error (MMSE) between the feature items in the projection of the 3D representation, and the corresponding feature items in the source projection. A comparison is performed in 3D between the estimated deprojected positions of the feature items from the 2D source projection and the corresponding feature items of the 3D representation. The closest-fitting 3D reference representation may then be deformed to optimize the correspondence with the source projection. Each point in the mesh which defines the geometry of the 3D representation is free to move during the deformation. The search for the best-fitting position (i.e., orientation and translation) is repeated using the deformed 3D representation, and the deformation and search may be repeated iteratively until convergence occurs or terminated at any time.

Thus the geometry of the 3D model is tailored to the target object in two ways. First, when more than one reference representation is available, the selection of the best-fitting reference representation from a set of references enables the optimal coarse-grain choice to be made. Second, deformation enables fine scale tuning in which errors introduced by inaccurate choice of viewpoint are progressively reduced by iteration. The invention requires no information about the viewpoint from which the 2D source projection was captured, because a search is performed over all possible viewpoints, and the viewpoint is taken to be that which corresponds to the closest fit between the projected 3D representation and the 2D source data.

In a first aspect, the invention comprises a method of comparing at least one source 2D projection of a source multifeatured object to a reference library of 3D reference objects. In accordance with the method, a plurality of reference 3D representations of generically similar multifeatured objects is provided, and a viewpoint-invariant search of the reference 3D representations is performed to locate the reference 3D representation having a 2D projection most resembling the source projection(s). In some embodiments, resemblance is determined by a degree of alignment between feature items in the 3D representation and corresponding feature items in the source 2D projection(s). Each reference 3D representation may be searched over a range of possible 2D projections of the 3D representation without actually generating any projections. The search over a range of possible 2D projections may comprise computing a rigid motion of the reference 3D representation optimally consistent with a viewpoint of the source multifeatured object in at least one of the 2D projections. The rigid motions may comprise pitch, roll, yaw, and translation in three dimensions. Automatic camera calibration may be performed by estimation of camera parameters, such as aspect ratio and field of view, from image landmarks.

In some embodiments, the optimum rigid motion may be determined by estimating a conditional mean pose or geometric registration as it relates to feature items comprising points, curves, surfaces, and subvolumes in a 3D coordinate space associated with the reference 3D representation such that the feature items are projectionally consistent with feature items in source 2D projection(s). MMSE estimates between the conditional mean estimate of the projected feature items and corresponding feature items of the reference 3D representation are generated. The rigid motion may be constrained by known 3D position information associated with the source 2D projection(s).

In some embodiments, the feature items may include curves as well as points which are extracted from the source projection using dynamic programming. Further, areas as well as surfaces and or subvolumes may be used as features generated via isocontouring (such as via the Marching Cubes algorithm) or automated segmentation algorithms. The feature items used in the matching process may be found automatically by using correspondences between the 2D source projection(s) and projected imagery of at least one reference 3D object.

The invention may further comprise the step of creating a 3D representation of the source 2D projection(s) by deforming the located (i.e., best-fitting) reference 3D representation so as to resemble the source multifeatured object. In one embodiment, the deformation is a large deformation diffeomorphism, which serves to preserve the geometry and topology of the reference 3D representation. The deformation step may deform the located 3D representation so that feature items in the source 2D projection(s) align with corresponding features in the located reference 3D representation. The deformation step may occur with or without rigid motions and may include affine motions. Further, the deformation step may be constrained by at least one of known 3D position information associated with the source 2D projection(s), and 3D data of the source object. The deformation may be performed using a closed form expression.

In a second aspect, the invention comprises a system for comparing at least one source 2D projection of a source multifeatured object to a reference library of 3D reference objects. The system comprises a database comprising a plurality of reference 3D representations of generically similar multifeatured objects and an analyzer for performing a viewpoint-invariant search of the reference 3D representations to locate the reference 3D representation having a 2D projection most resembling the source projection(s). In some embodiments, the analyzer determines resemblance by a degree of alignment between feature items in the 3D representation and corresponding feature items in the source 2D projection(s). The analyzer may search each reference 3D representation over a range of possible 2D projections of the 3D representation without actually generating any projections. In some embodiments, the analyzer searches over a range of possible 2D projections by computing a rigid motion of the reference 3D representation optimally consistent with a viewpoint of the source multifeatured object in at least one of the 2D projections. The rigid motions may comprise pitch, roll, yaw, and translation in three dimensions. The analyzer may be configured to perform automatic camera calibration by estimating camera parameters, such as aspect ratio and field of view, from image landmarks.

In some embodiments, the analyzer is configured to determine the optimum rigid motion by estimating a conditional mean of feature items comprising points, curves, surfaces, and subvolumes in a 3D coordinate space associated with the reference 3D representation such that the feature items are projectionally consistent with feature items in the source 2D projection(s). The analyzer is further configured to generate MMSE estimates between the conditional mean estimate of the projected feature items and corresponding feature items of the reference 3D representation. The rigid motion may be constrained by known 3D position information associated with the source 2D projection(s).

In some embodiments, the analyzer is configured to extract feature items from the source projection using dynamic programming. In further embodiments, the analyzer may be configured to find feature items used in the matching process automatically by using correspondences between source imagery and projected imagery of at least one reference 3D object.

The invention may further comprise a deformation module for creating a 3D representation of the at least one source 2D projection by deforming the located (i.e., best-fitting) reference 3D representation so as to resemble the source multifeatured object. In one embodiment, the deformation module deforms the located reference 3D representation using large deformation diffeomorphism, which serves to preserve the geometry and topology of the reference 3D representation. The deformation module may deform the located 3D representation so that feature items in the source 2D projection(s) align with corresponding features in the located reference 3D representation. The deformation module may or may not use rigid motions and may use affine motions. Further, the deformation module may be constrained by at least one of known 3D position information associated with the source 2D projection(s), and 3D data of the source object. The deformation module may operate in accordance with a closed form expression.

In a third aspect, the invention comprises a method of comparing a source 3D object to at least one reference 3D object. The method involves creating 2D representations of the source object and the reference object(s) and using projective geometry to characterize a correspondence between the source 3D object and a reference 3D object. For example, the correspondence may be characterized by a particular viewpoint for the 2D representation of the 3D source object.

In a fourth aspect, the invention comprises a system for comparing a source 3D object to at least one reference 3D object. The system comprises a projection module for creating 2D representations of the source object and the reference object(s) and an analyzer which uses projective geometry to characterize a correspondence between the source 3D object and a reference 3D object.

In a fifth aspect, the above described methods and systems are used for the case when the 3D object is a face and the reference 3D representations are avatars.

In a sixth aspect, the invention comprises a method for creating a 3D representation from at least one source 2D projection of a source multifeatured object. In accordance with the method, at least one reference 3D representation of a generically similar object is provided, one of the provided representation(s) is located, and a 3D representation of the source 2D projection(s) is created by deforming the located reference representation in accordance with the source 2D projection(s) so as to resemble the source multifeatured object. In some embodiments, the source 2D projection(s) is used to locate the reference representation. In further embodiments, the set of reference representations includes more than one member, and the reference most resembling the source 2D projection(s) is located by performing a viewpoint-invariant search of the set of reference representations, without necessarily actually generating any projections. The search may include computing a rigid motion of the reference representation optimally consistent with a viewpoint of the source multifeatured object in at least one of the source projections.

In a preferred embodiment, a 3D representation of the source projection(s) is created by deforming the located reference representation so as to resemble the source multifeatured object. The deformation may be a large deformation diffeomorphism. In some embodiments, the deformation deforms the located reference so that feature items in the source projection(s) align with corresponding feature items in the located 3D reference representation. In some embodiments, the deformation is performed in real time.

In a seventh aspect, the invention comprises a system for creating a 3D representation from at least one source 2D projection of a source multifeatured object. The system includes a database of at least one reference 3D representation of a generically similar object, and an analyzer for locating one of the provided representation(s). The system further includes a deformation module for creating a 3D representation of the source 2D projection(s) by deforming the located reference representation in accordance with the source 2D projection(s) so as to resemble the source multifeatured object. In some embodiments, the analyzer uses the source 2D projection(s) to locate the reference representation. In further embodiments, the set of reference representations includes more than one member, and the analyzer locates the reference most resembling the source 2D projection(s) by performing a viewpoint-invariant search of the set of reference representations, without necessarily actually generating any projections. The search may include computing a rigid motion of the reference representation optimally consistent with a viewpoint of the source multifeatured object in at least one of the source projections.

In a preferred embodiment, the deformation module creates a 3D representation of the source projection(s) by deforming the located reference representation so as to resemble the source multifeatured object. The deformation may be a large deformation diffeomorphism. In some embodiments, the deformation module deforms the located reference so that feature items in the source projection(s) align with corresponding feature items in the located 3D reference representation. In some embodiments, the deformation module operates in real time.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF THE PREFERRED EMBODIMENT

Figure 1:
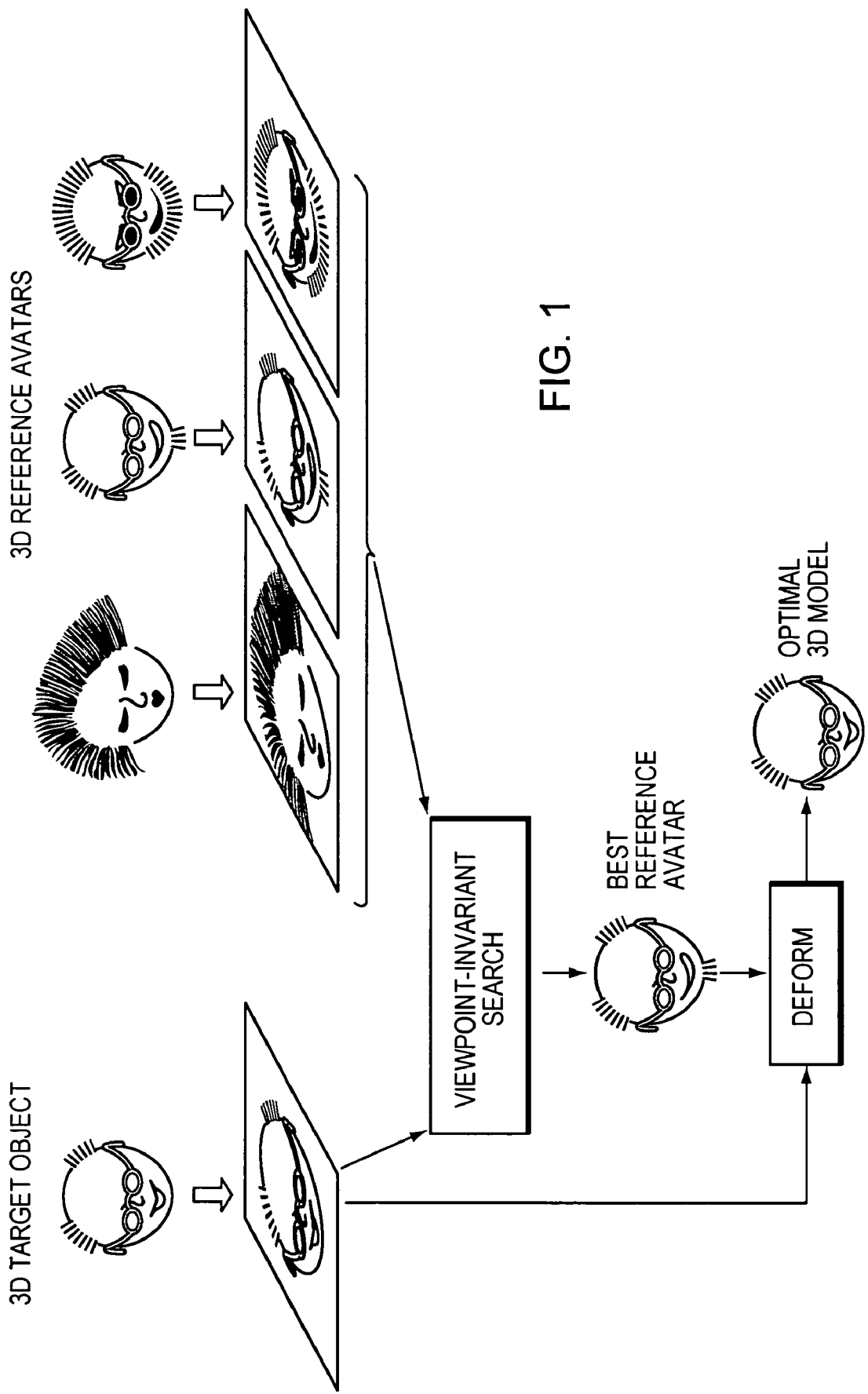
FIG. 1 schematically illustrates the various components of the invention, starting with the target object, the reference objects, and yielding an optimal 3D model after performing a search and deformation.

FIG. 1 illustrates the basic operation of the invention in the case where the 3D target multifeatured object is a face and the set of reference 3D representations are avatars. The matching process starts with a set of reference 3D avatars which represent, to the extent practicable, the range of different types of heads to be matched. For example, the avatars may include faces of men and women, faces with varying quantities and types of hair, faces of different ages, and faces representing different races. Typically the reference set includes numerous (e.g., several hundred or more) avatars, though the invention works with as few as one reference object, and as many for which storage space and compute time are available. In some situations, only a single reference avatar will be used. This case may arise, for example, when the best-fitting avatar has been selected manually, or by some other means, or when only one reference avatar is available. In FIG. 1, the source data of the target face is illustrated as a single 2D photograph of the target 3D face taken from an unknown viewpoint. First, selected features to be used for matching are identified in the source photograph. The features may be points, such as the extremities of the mouth and eyes, or curves representing a profile, an eyebrow, or other distinctive curve, or subareas such as an eyebrow, nose or cheek. The corresponding features are identified in the reference avatars. The selection of features in the target photograph, and the identification of corresponding features in the reference avatars may be done automatically according to the invention. Next, a viewpoint-invariant search is conducted in which each 3D avatar is notionally subjected to all possible rigid motions, and the features projected into 2D. The positions of the projected avatar features are compared to the feature positions in the target photograph. The avatar for which a particular rigid motion provides the closest fit between projected features and those of the source photograph is selected as the best reference avatar. FIG. 1 illustrates the best-fitting reference avatar to be the middle one.

Next, the best reference avatar is deformed to match the target photograph more closely. First the features of the photograph are reverse projected to the coordinates of the best reference avatar in the orientation and position corresponding to the best match. The mesh points of the avatar are then deformed in 3D to minimize the distances between the reverse-projected features of the photograph and the corresponding avatar features. The avatar resulting from this deformation will be a closer approximation to the target 3D face. The rigid motion search and deformation steps may be repeated iteratively, e.g., until the quality of fit no longer improves appreciably. The resulting 3D model is the optimal match to the target face.

The invention can be used effectively even when the source imagery includes only a part of the target face, or when the target face is partially obscured, such as, for example, by sunglasses or facial hair. The approach of the invention is suitable for any multifeatured object, such as faces, animals, plants, or buildings. For ease of explanation, however, the ensuing description will focus on faces as an exemplary (and non-limiting) application.

Figure 2A:
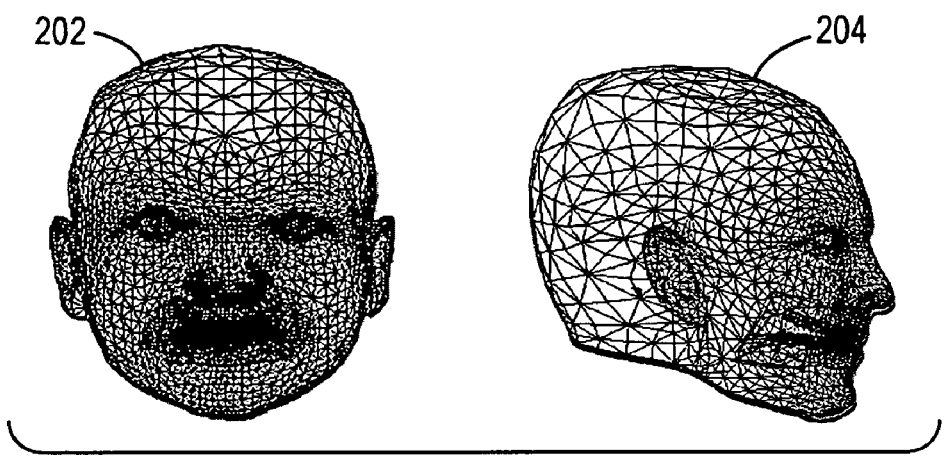
FIGS. 2A, 2B, and 2C schematically illustrate the components of a 3D avatar.
Figure 2B:
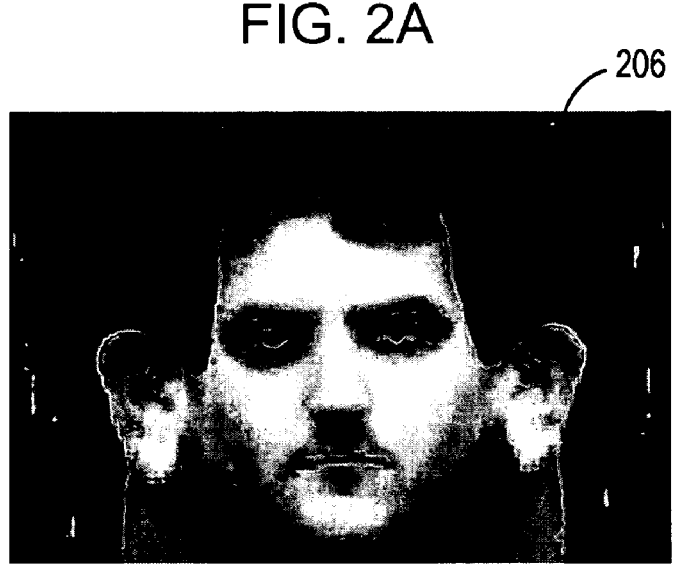
Figure 2C:
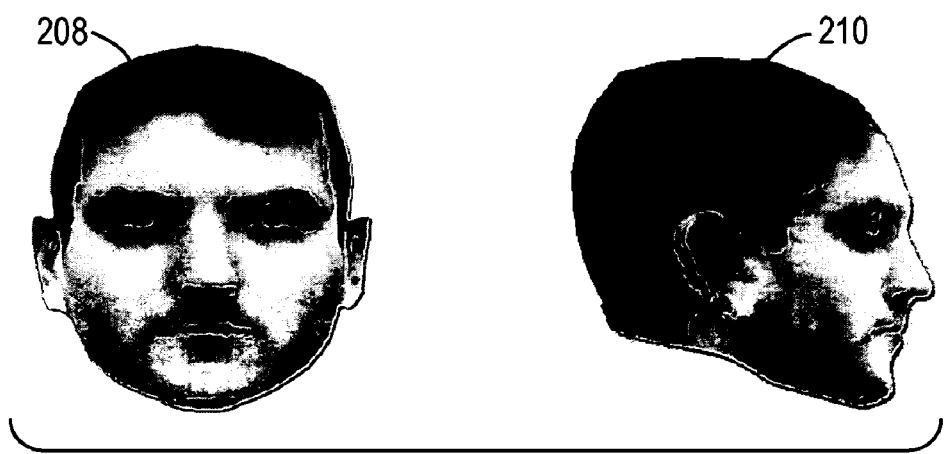

FIGS. 2A, 2B, and 2C show the components of a representative avatar. In one embodiment of the invention, the geometry of the avatar is represented by a mesh of points in 3D which are the vertices of set of triangular polygons approximating the surface of the avatar. FIG. 2A illustrates a head-on view 202 and a side view 204 of the triangular polygon representation. In one representation, each vertex is given a color value, and each triangular face may be colored according to an average of the color values assigned to its vertices. The color values are determined from a 2D texture map 206, illustrated in FIG. 2B, which may be derived from a photograph. In FIG. 2C, the final avatar with texture is illustrated in a head-on view 208 and side view 210. The avatar is associated with a coordinate system which is fixed to it, and is indexed by three angular degrees of freedom (pitch, roll, and yaw), and three translational degrees of freedom of the rigid body center in three-space. In addition, individual features of the avatar, such as the chin, teeth and eyes may have their own local coordinates (e.g., chin axis) which form part of the avatar description. The present invention may be equally applied to avatars for which a different data representation is used. For example, texture values may be represented as RGB values, or using other color representations, such as HSL. The data representing the avatar vertices and the relationships among the vertices may vary. For example, the mesh points may be connected to form non-triangular polygons representing the avatar surface.

The invention may include a conventional rendering engine for generating 2D imagery from a 3D avatar. The rendering engine may be implemented in OpenGL, or in any other 3D rendering system, and allows for the rapid projection of a 3D avatar into a 2D image plane representing a camera view of the 3D avatar. The rendering engine may also include the specification of the avatar lighting, allowing for the generation of 2D projections corresponding to varying illumination of the avatar. Lighting corresponding to a varying number of light sources of varying colors, intensities, and positions may be generated.

The feature items in the 2D source projection which are used for matching are selected by hand or via automated methods. These items may be points or curves. When the source projection includes a front view, suitable points may be inflection points at the lips, points on the eyebrows, points at the extremities of the eyes, or extremities of nostrils, and suitable curves may include an eyebrow or lip. When the source projection includes a side view, the feature points corresponding to the profile are used and may include the tip of the nose or chin. Suitable feature item curves may include distinct parts of the profile, such as nose, forehead, or chin.

When the feature items are determined manually, a user interface is provided which allows the user to identify feature points individually or to mark groups of points delineated by a spline curve, or to select a set of points forming a line.

The automated detection of feature items on the 2D source projection is performed by searching for specific features of a face, such as eyeballs, nostrils, and lips. As understood by those of ordinary skill in the art, the approach may use Bayesian classifiers and decision trees in which hierarchical detection probes are built from training data generated from actual avatars. The detection probes are desirably stored at multiple pixel scales so that the specific parameters, such as for orientation of a feature, are only computing on finer scales if the larger-scale probes yield a positive detection. The feature detection probes may be generated from image databases representing large numbers of individuals who have had their features demarcated and segregated so that the detection probes become specifically tuned to these features. The automated feature detection approach may use pattern classification, Bayes nets, neural networks, or other known techniques for determining the location of features in facial images.

The automated detection of curve features in the source projection may use dynamic programming approaches to generate curves from a series of points so as to reduce the amount of computation required to identify an optimal curve and maximize a sequentially additive cost function. Such a cost function represents a sequence of features such as the contrast of the profile against background, or the darkness of an eyebrow, or the crease between lips. A path of N points can be thought of as consisting of a starting node $x_0$ and a set of vectors $v_0, v_1, \ldots, v_{N-1}$ connecting neighboring nodes. The nodes comprising this path are defined as $$x_i = \sum_{j=0}^{i-1} v_j + x_0.$$

Rather than searching over all paths of length N, dynamic programming may be used to generate maximum (or minimum) cost paths. This reduces the complexity of the algorithm from $K^N$ to $NK^2$ where N is the length of a path and K is the total number of nodes, as dynamic programming takes advantage of the fact that the cost is sequentially additive, allowing a host of sub-optimal paths to be ignored. Dynamic programming techniques and systems are well-characterized in the art and can be applied as discussed herein without undue experimentation.

Next, the 3D rotation and translation from the avatar coordinates to the source projection is determined. This corresponds to finding the viewpoint from which the source projection was captured. In preferred embodiments, this is achieved by calculating the position of the avatar in 3D space that best matches the set of selected feature items in the 2D source projection. Generally, these feature items will be points, curves, or subareas and the source projection will be a photograph on which the position of these items can be measured, either manually or automatically. The position calculation may be based on the computation of the conditional mean estimate of the reverse projection positions in 3D of the 2D feature items, followed by the computation of MMSE estimates for the rotation and translation parameters in 3D, given the estimates of the 3D positions of the feature items. Since position in 3D space is a vector parameter, the MMSE estimate for translation position is closed form; when substituted back into the squared error function, it gives an explicit function in terms of only the rotations. Since the rotations are not vector parameters, they may be calculated using non-linear gradient descent through the tangent space of the group or via local representation using the angular velocities of the skew-symmetric matrices.

In addition to or in lieu of the least squares or weighted least squares techniques described herein, the distance metrics used to measure the quality of fit between the reverse projections of feature items from the source imagery and corresponding items in the 3D avatar may be, for example, Poisson or other distance metrics which may or may not satisfy the triangle inequality.

If feature items measured in 3D are available, such as from actual 3D source data from 3D cameras or scanners, the feature item matching may be performed directly, without the intermediate step of calculating the conditional mean estimate of the deprojected 2D features. The cost function used for positioning the 3D avatar can be minimized using algorithms such as closed form quadratic optimization, iterative Newton descent or gradient methods.

The 3D positioning technique is first considered without deformation of the reference avatar. In the following, a 3D reference avatar is referred to as a CAD (computer-aided design) model, or by the symbol CAD. The set of $x_j=(x_j,y_j,z_j)$, $j=1, \ldots, N$ features is defined on the CAD model. The projective geometry mapping is defined as either positive or negative z, i.e., projection occurs along the z axis. In all the projective geometry $$p_j = \left(\frac{\alpha_1 x_j}{-z_j}, \frac{\alpha_2 y_j}{-z_j}\right)$$

(for negative z-axis projection), or $$p_j = \left(\frac{\alpha_1 x_j}{z_j}, \frac{\alpha_2 y_j}{z_j}\right)$$

(for positive z-axis projection) is the projected position of the point $x_j$ where $\alpha$ is the projection angle. Let the rigid transformation be of the form $A=O,b:x \mapsto Ox+b$ centered around $x_c=0$. For positive (i.e., $z>0$) mapping and $n=0$, $$p_i = \left(\frac{\alpha_1 x_i}{z_i}, \frac{\alpha_2 y_i}{z_i}\right), i=1, \ldots, N,$$

where n is the cotangent of the projective angle. The following data structures are defined throughout:

$$P_i = \begin{pmatrix} \frac{p_{i1}}{\alpha_1} \\ \frac{p_{i2}}{\alpha_2} \\ 1 \end{pmatrix}, Q_i = \left(I - \frac{P_i(P_i)^t}{\|P_i\|^2}\right), \bar{Q} = \sum_{i=1}^{N} Q_i, X_Q = \sum_{i=1}^{N} Q_i X_i \quad \text{(Equation 1)}$$

$$X_j = \begin{pmatrix} x_j^1 & x_j^2 & x_j^3 & 0 & 0 & 0 & 0 & 0 & 0 \\ 0 & 0 & 0 & x_j^1 & x_j^2 & x_j^3 & 0 & 0 & 0 \\ 0 & 0 & 0 & 0 & 0 & 0 & x_j^1 & x_j^2 & x_j^3 \end{pmatrix}, \quad \text{(Equation 2)}$$

with $(\cdot)^t$ matrix transpose, and the identity matrix $$I = \begin{pmatrix} 1 & 0 & 0 \\ 0 & 1 & 0 \\ 0 & 0 & 1 \end{pmatrix}.$$

For negative (i.e., $z<0$) mapping, $$p_j = \left(\frac{\alpha_1 x_j}{-z_j}, \frac{\alpha_2 y_j}{-z_j}\right),$$

and the change $$P_i = \left(-\frac{p_{i1}}{\alpha_1}, -\frac{p_{i2}}{\alpha_2}, 1\right)^t$$

is made.

The basis vectors $Z_1$, $Z_2$, $Z_3$ at the tangent to the $3\times 3$ rotation element O are defined as:

$Z_1 = 1_1 O^{old} = [o_{21}, o_{22}, o_{23}, -o_{11}, -o_{12}, -o_{31}, 0, 0, 0]^t$ (Equation 3)

$Z_2 = 1_2 O^{old} = [o_{31}, o_{32}, o_{33}, 0, 0, 0, -o_{11}, -o_{12}, -o_{13}]^t$ (Equation 4)

$Z_3 = 1_3 O_{old} = [0, 0, 0, o_{31}, o_{32}, o_{33}, -o_{21}, -o_{22}, -o_{23}]^t$ (Equation 5)

$$\text{where } 1_1 = \begin{pmatrix} 0 & 1 & 0 \\ -1 & 0 & 0 \\ 0 & 0 & 0 \end{pmatrix}, 1_2 = \begin{pmatrix} 0 & 0 & 1 \\ 0 & 0 & 0 \\ -1 & 0 & 0 \end{pmatrix}, \quad \text{(Equation 6)}$$

$$1_3 = \begin{pmatrix} 0 & 0 & 0 \\ 0 & 0 & 1 \\ 0 & -1 & 0 \end{pmatrix}.$$

The reverse projection of feature points from the 2D projection may now be performed. Given the feature points $p_j = (p_{j1}, p_{j2})$, $j=1, 2, \ldots$ in the image plane, the minimum norm-estimates for $\hat{z}_i$ are given by, $$\hat{O}, \hat{b} \text{ as } \hat{z}_i = \frac{<Ox_i + b, P_i>}{\|P_i\|^2},$$

and the MMSE $\hat{O}, \hat{b}$ satisfies $$\min_{z,O,b} \sum_{i=1}^{N} \|Ox_i + b - z_i P_i\|^2 = \min_{O,b} \sum_{i=1}^{N} (Ox_i + b)^t Q_i (Ox_i + b). \quad \text{(Equation 7)}$$

During the process of matching a source image to reference avatars, there may be uncertainty in the determined points x, implying that cost matching is performed with a covariance variability structure built in to the formula. In this case, the norm has within it a $3\times 3$ matrix which represents this variability in the norm.

The optimum rotation and translation may next be estimated from feature points. Given the projective points $p_j$, $j=1, 2, \ldots$, the rigid transformation has the form $O,b: x \mapsto Ox+b$ (centered around center $x_c=0$). Then for positive ($z>0$) mapping and $n=0$, $$p_j = \left(\frac{\alpha_1 x_j}{z_j}, \frac{\alpha_2 y_j}{z_j}\right),$$

$$\min_{z,O,b} \sum_{i=1}^{N} \|Ox_i + b - z_i P_i\|^2 = \min_{O,b} \sum_{i=1}^{N} (Ox_i + b)^t Q_i (Ox_i + b). \quad \text{(Equation 8)}$$

The optimum translation/rotation solutions are preferably generated as follows. Compute the 3×9 matrix $M_i = X_i - \overline{Q}^{-1} X_Q$ and evaluate exhaustively the cost function choosing minimum $\hat{O}$ and computing the translation $\hat{b} = -(\Sigma_{i=1}^N Q_i)^{-1} \Sigma_{i=1}^N Q_i \hat{O} x_i$ with minimum $\hat{O}$ attained, for example, via brute force search over the orthogonal group which may for example be parameterized by pitch, roll or yaw or running the gradient search algorithm to convergence as follows.

$$\text{Brute Force: } \hat{O} = \arg\min_{O} O^t \left( \sum_{i=1}^{N} M_i^t Q_i M_i \right) O; \quad \text{(Equation 9)}$$

$$\text{Gradient: } O^{new} = e^{\Sigma_{i=1}^{3} \alpha_i^{new} 1_i} O^{old}, \alpha_j^{new} \quad \text{(Equation 10)}$$

$$= <2\left(\sum_{i=1}^{N} M_i^t Q_i M_i\right) O^{old}, Z_j >, j = 1, 2, 3$$

$$\text{with } <f, g> = \sum_{i=1}^{3} f_i g_i.$$

In a typical application some information about the position of the object in 3D space is known. For example, in a system which takes a succession of photographs of a moving source object, such as in a tracking system, the position from a previous image may be available. The invention may incorporate this information into the matching process as follows. Given a sequence of points $p_i$, $i=1, \ldots, N$ and a rigid transformation of the form $A=O,b:x \mapsto Ox+b$ (centered around $x_c=0$), the MMSE of rotation and translation $\hat{O}, \hat{b}$ satisfies:

$$\min_{z,O,b} \sum_{i=1}^{N} \|Ox_i + b - z_i P_i\|^2 + (b-\mu)^t \Sigma^{-1}(b-\mu) = \quad \text{(Equation 11)}$$

$$\min_{O,b} \sum_{i=1}^{N} (Ox_i + b)^t Q_i (Ox_i + b) + (b-\mu)^t \Sigma^{-1}(b-\mu).$$

The 3×9 matrix $M_i$ and a 3×1 column vector $N$ are computed:

$$= M_i = X_i - \overline{Q}_\Sigma^{-1} X_Q, N = \overline{Q}_\Sigma^{-1} X_Q, \overline{Q}_\Sigma = (\overline{Q} + \Sigma^{-1}), \psi =$$
$$\overline{Q}_\Sigma^{-1} \Sigma_\mu, \phi = \overline{Q}_\Sigma^{-1} \Sigma_\mu - \mu, \Sigma_\mu = \Sigma^{-1} \mu. \quad \text{(Equation 12)}$$

The translation is then determined $\hat{b} = -\overline{Q}_\Sigma^{-1} X_Q \hat{O} + \overline{Q}_\Sigma^{-1} \Sigma_\mu$ at the minimum $\hat{O}$ obtained by exhaustive search or gradient algorithm run until convergence:

$$\text{Brute Force: } \hat{O} = \arg\min_{O} O^t \left( \sum_{i=1}^{N} M_i^t Q_i M_i + N^t \Sigma^{-1} N \right) O + \quad \text{(Equation 13)}$$

$$2O^t \left( \sum_{i=1}^{N} M_i^t Q_i \psi - N \Sigma^{-1} \phi \right)$$

$$\text{Gradient: } O^{new} = e^{\Sigma_{i=1}^{3} \alpha_i^{new} 1_i} O^{old}, \alpha_j^{new} \quad \text{(Equation 14)}$$

$$= <2\left(\sum_{i=1}^{N} M_i^t Q_i M_i + N^t \Sigma^{-1} N\right) O^{old} +$$

$$2\sum_{i=1}^{N} M_i^t Q_i \psi - N^t \Sigma^{-1} \phi, Z_j >$$

with the projection onto the basis vectors $Z_1$, $Z_2$, $Z_3$ of equations 3-5 defined at the tangent to $O^{old}$ in the exponential representation where $\alpha^{new}$ are the directional derivatives of cost.

The rotation/translation data may be indexed in many different ways. For example, to index according to the rotation around the center of the object, rather than fixed external world coordinates, the coordinates are just reparameterized by defining $\tilde{x} \leftarrow x - x_c$. All of the techniques described herein remain the same.

The preferred 3D algorithm for rigid motion efficiently changes states of geometric pose for comparison to the measured imagery. The preferred 3D algorithm for diffeomorphic transformation of geometry matches the geometry to target 2D image features. It should be understood, however, that other methods of performing the comparison of the 3D representation to the source imagery may be used, including those that do not make use of specific image features.

Once the rigid motion (i.e., rotation and translation) that results in the best fit between 2D source imagery and a selected 3D avatar is determined, the 3D avatar may be deformed in order to improve its correspondence with the source imagery. The allowed deformations are generally limited to diffeomorphisms of the original avatar. This serves to preserve the avatar topology, guaranteeing that the result of the deformation will be a face. The deformations may also enforce topological constraints, such as the symmetry of the geometry. This constraint is especially useful in situations where parts of the source object are obscured, and the full geometry is inferred from partial source information.

Figure 3A:
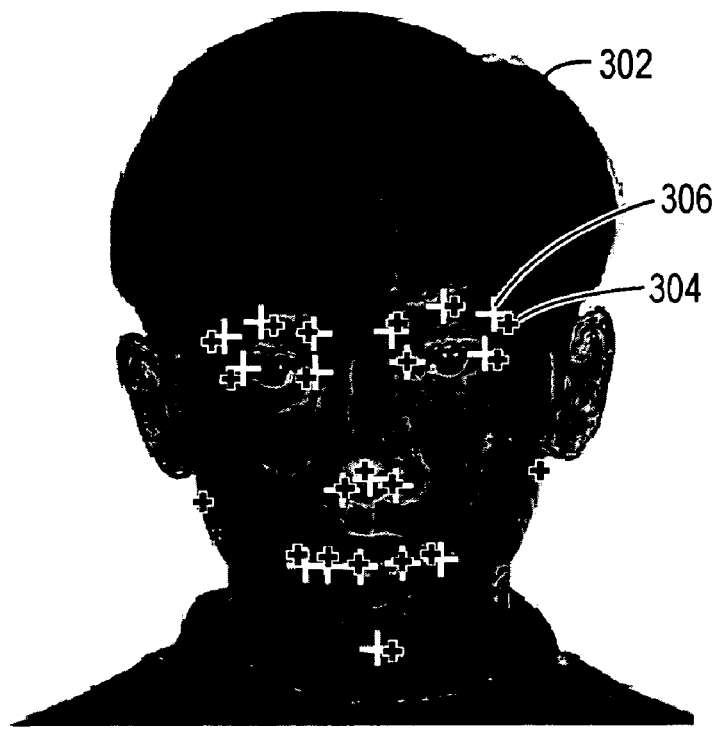
FIG. 3 schematically illustrates the matching of feature items in the 2D imagery.
Figure 3B:
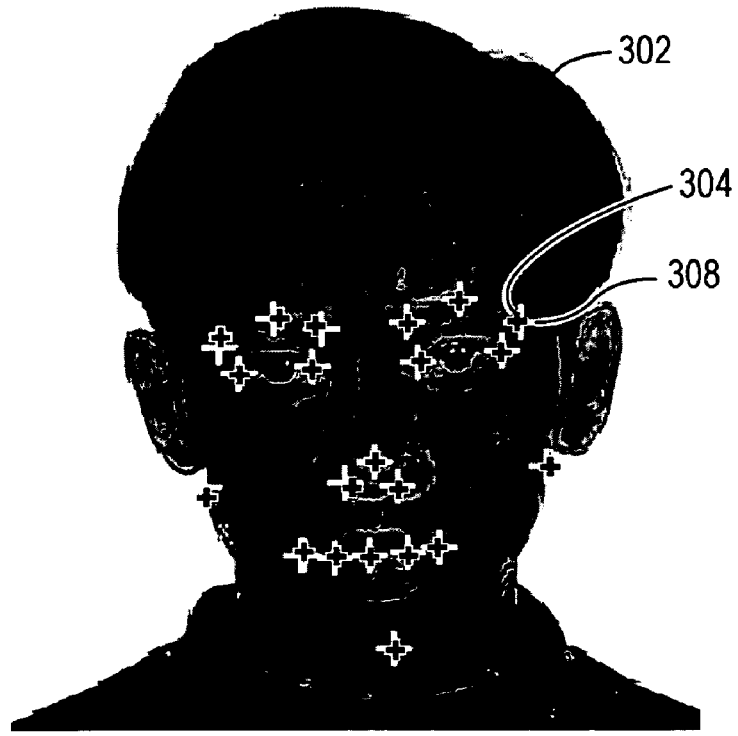

FIGS. 3A and 3B illustrate the effect of avatar deformation on the matching of the avatar to the source imagery. In FIG. 3A, feature points are shown as black crosses on the source image 302. An example is the feature point at the left extremity of the left eyebrow 304. The projections of the corresponding feature points belonging to the best-matching reference avatar with optimal rigid motion prior to deformation are shown as white crosses. It can be seen that the projected point corresponding to the left extremity of the left eyebrow 306 is noticeably displaced from its counterpart 304. In FIG. 3B, the same source image 302 is shown with feature points again indicated by black crosses. This time, the best-fitting avatar feature points shown as white crosses are now projected after deformation. The correspondence between source feature points and avatar feature points is markedly improved, as shown, for example, by the improved proximity of the projected left eyebrow feature point 308 to its source counterpart 304.

The 3D avatar diffeomorphism calculation starts with the initial conditions for placement of the avatar determined by the feature item detection and computation of the best-fitting rigid motion and the original geometry of the avatar. It then proceeds by allowing all of the points on the avatar to move independently according to a predefined formula to minimize the distance between the deformed avatar points in 3D and the conditional mean estimates of the 2D landmark points reverse projected to the 3D coordinates. Once this diffeomorphism is calculated, the 3D landmark rigid motion algorithm is applied again to the source projections and feature items to find the best guess of the camera positions given this newly transformed avatar with its new vertex positions. Subsequently, a new diffeomorphism is generated, and this process is continued until it converges. Alternatively, iteration may not be used, with the rigid motion calculation being performed only a single time, and just one diffeomorphism transformation applied. In the case where camera orientations (i.e., the viewpoint of the measured source projections) are known precisely, these can be used as fixed inputs to the calculation, with no rigid transformation required. When the measured sets of feature items are in 3D, such as from a cyber scan or 3D camera observations of the candidate head, the avatar is transformed onto the candidate sets of points without any intermediate generation of the candidate points in 3D space via the conditional mean algorithm for generating 3D points from 2D sets of points.

The diffeomorphic deformation of an avatar proceeds as follows. Given the set $x_j=(x_j,y_j,z_j)$, $j=1,\ldots,N$ feature items defined on the CAD model, with the projective geometry mapping with $$\alpha_1 = \frac{2n}{w}, \alpha_2 = \frac{2n}{h},$$

where n is cotangent of the angle, and w, h are aspect ratio widths and heights, $$(x, y, z) \mapsto p(x, y, z) = \left(\frac{\alpha_1 x}{z}, \frac{\alpha_2 y}{z}\right),$$

with observations of the feature items through the projective geometry $$p_j = \left(\frac{\alpha_1 x_j}{z_j}, \frac{\alpha_2 y_j}{z_j}\right).$$

The goal is to construct the deformation of the CAD model $x \to x+u(x)$, $x \in CAD$ with unknown camera rigid motions corresponding to the measured projective image feature items. The projective points for each orientation $v=1, \ldots, V$, and smoothing matrices $$P_i^{(v)} = \begin{pmatrix} \frac{p_{i1}^{(v)}}{\alpha_1} \\ \frac{p_{i2}^{(v)}}{\alpha_2} \\ 1 \end{pmatrix}, Q_i^v = I - \frac{P_i^{(v)} P_i^{(v)t}}{\|P_i^{(v)}\|^2}, \quad \text{(Equation 15)}$$

$$\overline{Q}_i = \sum_{v=1}^{V} O^{(v)t} Q_i^{(v)} O^{(v)}, \overline{Q}_{Oi} = \sum_{v=1}^{V} O^{(v)t} Q_i^{(v)},$$

-continued $$\overline{Q} = \begin{pmatrix} \overline{Q}_1 & 0 & \cdots & 0 \\ 0 & \overline{Q}_2 & 0 & \cdots \\ \vdots & \vdots & \vdots & \vdots \\ 0 & 0 & \cdots & \overline{Q}_N \end{pmatrix}_{3N \times 3N}, \overline{Q}_o = \begin{pmatrix} \overline{Q}_{O_1} & 0 & \cdots & 0 \\ 0 & \overline{Q}_{O_2} & 0 & \cdots \\ \vdots & \vdots & \vdots & \vdots \\ 0 & 0 & \cdots & \overline{Q}_{O_N} \end{pmatrix}_{3N \times 3N}, \quad \text{(Equation 16)}$$

$$K = \begin{pmatrix} K_{11} & K_{12} & \cdots & K_{1N} \\ K_{21} & K_{21} & \cdots & K_{2N} \\ \vdots & \vdots & \vdots & \vdots \\ K_{NI} & K_{NI} & \cdots & K_{NN} \end{pmatrix}_{3N \times 3N}, \quad \text{(Equation 17)}$$

$$K_{ij} = \begin{pmatrix} K_{ij}(1,1) & K_{ij}(1,2) & K_{ij}(1,3) \\ K_{ij}(2,1) & K_{ij}(2,2) & K_{ij}(2,3) \\ K_{ij}(3,1) & K_{ij}(3,2) & K_{ij}(3,3) \end{pmatrix},$$

are constructed, where for example $K_{ij}=\mathrm{diag}(e^{-\alpha\|x_i-x_j\|}, e^{-\alpha\|x_i-x_j\|}, e^{-\alpha\|x_i-x_j\|})$ corresponds to the square root inverse Laplacian operator $L=\mathrm{diag}(-\nabla^2+c)$.

In one embodiment, the avatar may be deformed with small deformations only and no rigid motions. For this embodiment, it is assumed that the measured feature items are all points from a single camera viewing which generated the projected source image in which the feature points were measured. The goal is to construct the deformation of the CAD model constructing the mapping $x \to x+u(X)$, $x \in CAD$:

$$\min_{u,z_n} \|Lu\|^2 + \sum_{n=1}^{N} \|(x_n + u(x_n)) - z_n P_n\|^2 = \quad \text{(Equation 18)}$$

$$\min_{u} \|Lu\|^2 + \sum_{n=1}^{N} (x_n + u(x_n))^t Q_n (x_n + u(x_n)).$$

First, the transformation of the model $x \to x+u(x)$ with $u(x)=\Sigma_{n=1}^{N} K(x_n,x)\beta_n$ and where $$\begin{pmatrix} \beta_1 \\ \vdots \\ \beta_N \end{pmatrix} = K^{-1} \left( -\frac{1}{\sigma^2} \left( K^{-1} + \frac{1}{\sigma^2} \overline{Q} \right)^{-1} \left( \overline{Q} \begin{pmatrix} x_1 \\ \vdots \\ x_N \end{pmatrix} \right) \right) \quad \text{(Equation 19)}$$

is computed. Next, rigid motions are added and the following equation solved for the optimizer:

$$\min_{u} \|Lu\|^2 + \sum_{n=1}^{N} \sum_{v=1}^{V} (O^{(v)}(x_n + u(x_n)) + \quad \text{(Equation 20)}$$

$$b^{(v)})^t Q_n^{(v)} (O^{(v)}(x_n + u(x_n)) + b^{(v)}).$$

The transformation of the model using small deformation $x \to x+u(x)$ is computed, where $$u(x) = \sum_{n=1}^{N} K(x_n, x)\beta_n \text{ and} \quad \text{(Equation 21)}$$

$$\begin{pmatrix} \beta_1(44) \\ \vdots \\ \beta_N \end{pmatrix} = K^{-1}\left(-\frac{1}{\sigma^2}\left(K^{-1} + \frac{1}{\sigma^2}\overline{Q}\right)^{-1}\left(\overline{Q}\begin{pmatrix} x_1 \\ \vdots \\ x_N \end{pmatrix} + \begin{pmatrix} \sum_{v=1}^{V} O^{(v)t} Q_1^{(v)}(b^{(v)}) \\ \vdots \\ \sum_{v=1}^{V} O^{(v)t} Q_N^{(v)}(b^{(v)}) \end{pmatrix}\right)\right),$$

In another embodiment, diffeomorphic deformations with no rigid motions of the avatar are applied. In the case that the change in shape of the face is extensive the large deformation $\phi: x \mapsto \phi(x)$ satisfying $\phi = \phi_1$, $\phi_t = \int_0^1 v_s(\phi_s(x))ds + x$, $x \in CAD$ is generated. The deformation of the CAD model constructing the mapping $x \mapsto \phi(x)$, $x \in CAD$ is constructed:

$$\min_{v_1, t \in [0,1], z_n} \int_0^1 \|Lv_t\|^2 dt + \sum_{n=1}^{N} \|\phi(x_n) - z_n P_n\|^2 = \quad \text{(Equation 22)}$$

$$\min_{v_1, t \in [0,1]} \int_0^1 \|Lv_t\|^2 dt + \sum_{n=1}^{N} \phi(x_n)^t Q_n \phi(x_n).$$

Using the initialization $v^{new}=0$, $\phi^{new}(x)=x$, $x \in CAD$, mappings are repeatedly generated from the new vector field by running an iterative algorithm until convergence:

$$v_t^{new}(\cdot) = \sum_{n=1}^{N} K(\phi_t^{new}(x_n), \cdot) D_{\phi_t^{new}(x_n)} \phi_{t,1}^{new} Q_n \phi^{new}(x_n), \quad \text{(Equation 23)}$$

$$\phi^{new}(x) = \int_0^1 v_t^{new}(\phi_t^{new}(x))dx + x, \quad \text{(Equation 24)}$$

where $$D_{\phi_t(x_n)}\phi_{t,1} = \left(\frac{\partial \phi_1 \circ \phi_t^{-1}}{\partial y_j}\bigg|_{\phi_t(x_n)}\right).$$

The addition rigid motions to the large deformation. $x \mapsto \phi(x)$, $x \in CAD$ is accomplished as follows:

$$\min_{v_t: \dot{\phi}_t = v_t(\phi_t), t \in [0,1], z_n} \int_0^1 \|Lv_t\|^2 dt + \quad \text{(Equation 25)}$$

$$\sum_{n=1}^{N}\sum_{v=1}^{V} \|O^{(v)}\phi(x_n) + b^{(v)} - z_n^{(v)} P_n^{(v)}\|^2 =$$

$$\min_{v_t, t \in [0,1]} \int_0^1 \|Lv_t\|^2 dt =$$

-continued $$\sum_{n=1}^{N}\sum_{v=1}^{V} (O^{(v)}\phi(x_n) + b^{(v)})^t Q_n^{(v)} (O^{(v)}\phi(x_n) + b^{(v)}).$$

Using the initialization $v^{new}=0$, $\phi^{new}(x)=x$, $x \in CAD$, a mapping is generated from the new vector field by running an iterative algorithm until convergence:

$$v_t^{new}(\cdot) = \sum_{n=1}^{N} K(\phi_t^{new}(x_n), \cdot) D_{\phi_t^{new}(x_n)} \quad \text{(Equation 26)}$$

$$\phi_{t,1}^{new}\left(\sum_{v=1}^{V} O^{(v)t} Q_n^{(v)}(O^{(v)}\phi^{new}(x_n) + b^{(v)})\right);$$

$$\phi^{new}(x) = \int_0^1 v_t^{new}(\phi_t^{new}(x))dx + x, \quad \text{(Equation 27)}$$

where $D_{\phi_t(x_n)}\phi_{t,1} = \left(\frac{\partial \phi_1 \circ \phi_t^{-1}}{\partial y_j}\bigg|_{\phi_t(x_n)}\right).$ In a further embodiment, the deformation may be performed in real time for the case when the rigid motions (i.e., the rotation/translation) which bring the avatar into correspondence with the one or more source 2D projection are not known. A similar approach to the one above is used, with the addition of an estimation of the rigid motions using the techniques described herein. The initialization $u^{new}=0$ is used. Rigid motions are calculated using the rotation/translation techniques above to register the CAD model $x \mapsto x + u^{new}(x)$ to each photograph, generating rigid motions $O^{(v)new}, b^{(v)new}$, $v=1, 2, \ldots O^{(v)new}, b^{(v)new}$ are fixed from the previous step, and the deformation of the CAD model $x \mapsto x + u^{new}(x)$ or large deformation $x \mapsto \phi(x)$ are computed using the above techniques to solve the real-time small deformation or large deformation problem:

$$\text{(small) } \min_{u} \|Lu\|^2 + \sum_{n=1}^{N}\sum_{v=1}^{V} (O^{(v)}(x_n + u(x_n)) + b^{(v)})^t \quad \text{(Equation 28)}$$

$$Q_n^{(v)}(O^{(v)}(x_n + u(x_n)) + b^{(v)}).$$

$$\text{(large) } \min_{v_t, t \in [0,1]} \int_0^1 \|Lv_t\|^2 dt + \quad \text{(Equation 29)}$$

$$\sum_{n=1}^{N}\sum_{v=1}^{V} (O^{(v)}\phi(x_n) + b^{(v)})^t Q_n^{(v)} (O^{(v)}\phi(x_n) + b^{(v)}).$$

In another embodiment, the avatar is deformed in real-time using diffeomorphic deformations. The solution to the real-time deformation algorithm generates a deformation which may be used as an initial condition for the solution of the diffeomorphic deformation. Real-time diffeomorphic deformation is accomplished by incorporating the real-time deformations solution as an initial condition and then performing a small number (in the region of 1 to 10) iterations of the diffeomorphic deformation calculation.

The deformation may include affine motions. For the affine motion $A: x \rightarrow Ax$ where A is the 3×3 generalized linear matrix so that $$\min_{A,z_n} \sum_{n=1}^{N} \sum_{v=1}^{V} \|O^{(v)} A x_n + b^{(v)} - z_n^{(v)} P_n^{(v)}\|^2 = \quad \text{(Equation 30)}$$

$$\min_{A} \sum_{n=1}^{N} \sum_{v=1}^{V} (O^{(v)} A x_n + b^{(v)})^t Q_n^{(v)} (O^{(v)} A x_n + b^{(v)}),$$

the least-squares estimator $\hat{A}:x \to \hat{A}x$ is computed:

$$\hat{A} = -\left(\sum_{n=1}^{N} X_n^t \bar{Q}_n X_n\right)^{-1} \left(\sum_{n=1}^{N} X_n^t \sum_{v=1}^{V} O^{(v)t} Q_n^{(v)} b^{(v)}\right). \quad \text{(Equation 31)}$$

In many cases, both feature items in the projective imagery as well as the imagery itself can be used to drive the deformation of the avatar. Augmentation of source data to incorporate source imagery may improve the quality of the fit between the deformed avatar and the target face. To implement this, one more term is added to the deformation techniques. Let I be the measured imagery, which in general includes multiple measured images $I^{(v)}$, $v=1, 2, \ldots$ corresponding to an indexed sequence of pixels indexed by $p \in [0, 1]^2$, with the projection mapping points $$x = (x, y, z) \in IR^3 \mapsto p(x) = \left(p_1(x) = \frac{\alpha_1 x}{z}, p_2(x) = \frac{\alpha_2 y}{z}\right).$$

For the discrete setting of pixels in the source image plane with color (R,G,B) template, the observed projective $\Pi(p)$ is an (R,G,B) vector and the projective matrix becomes $$P_x = \begin{pmatrix} \frac{\alpha_1}{z+n} & 0 & 0 \\ 0 & \frac{\alpha_2}{z+n} & 0 \end{pmatrix},$$

operating on points $(x, y, z) \in IR^3$ according to the projective matrix $$P_x : (x, y, z) \mapsto (p_1(x, y, z), p_2(x, y, z)) = \begin{pmatrix} \frac{\alpha_1}{z+n} & 0 & 0 \\ 0 & \frac{\alpha_2}{z+n} & 0 \end{pmatrix} \begin{pmatrix} x \\ y \\ z \end{pmatrix},$$

the point $x(p)$ being the revealed point which is not occluded (closest point to the projection on the ray) on the 3D CAD model which projects to the point p in the image plane. Next, the projected template matrices resulting from finite differences on the (R,G,B) components at the projective coordinate p of the template value are required. The norm is interpreted component wise:

$$\nabla^t \prod(p) = \begin{pmatrix} \frac{\partial}{\partial p_1} \prod(p)^r & \frac{\partial}{\partial p_2} \prod(p)^r \\ \frac{\partial}{\partial p_1} \prod(p)^g & \frac{\partial}{\partial p_2} \prod(p)^g \\ \frac{\partial}{\partial p_1} \prod(p)^b & \frac{\partial}{\partial p_2} \prod(p)^b \end{pmatrix}, \quad \text{(Equation 32)}$$

$$\dot{I}(p) \doteq I(p) - \prod(p),$$

$$\tilde{\nabla}^t \prod(p) = \nabla^t \prod(p) P_{x(p)} = \quad \text{(Equation 33)}$$

$$\begin{pmatrix} \frac{\partial \prod(p)^r}{\partial p_1} \frac{\alpha_1}{z(p)+n} & \frac{\partial \prod(p)^r}{\partial p_2} \frac{\alpha_2}{z(p)+n} & 0 \\ \frac{\partial \prod(p)^g}{\partial p_1} \frac{\alpha_1}{z(p)+n} & \frac{\partial \prod(p)^g}{\partial p_2} \frac{\alpha_2}{z(p)+n} & 0 \\ \frac{\partial \prod(p)^b}{\partial p_1} \frac{\alpha_1}{z(p)+n} & \frac{\partial \prod(p)^b}{\partial p_2} \frac{\alpha_2}{z(p)+n} & 0 \end{pmatrix},$$

with matrix norm $\|A-B\|^2 = |A^r - B^r|^2 + |A^g - B^g|^2 + |A^b - B^b|^2$.

Associated with each image is a translation/rotation assumed already known from the previous rigid motion calculation techniques. The following assumes there is one 2D image, with O,b identity, and let any of the movements be represented as $x \to x + u(x)$. Then $u(x) = Ox - x$ is a rotational motion, $u(x) = b$ is a constant velocity, $u(x) = \Sigma_i e_i E_i(x)$ is a constrained motion to a basis function such as "chin rotation," "eyebrow lift," etc., and the general motion u is given by:

$$\min_{u} \sum_{p \in [0,1]^2} \|I(p) - \prod(p) - \nabla^t \prod(p) P_{x(p)} u(x(p))\|^2 = \quad \text{(Equation 34)}$$

$$\min_{u} \sum_{p \in [0,1]^2} \|\dot{I}(p) - \tilde{\nabla}^t \prod(p) u(x(p))\|^2$$

$$= \min_{u} -2 \sum_{p \in [0,1]^2} u(x(p))^t \dot{I}(p) \quad \text{(Equation 35)}$$

$$\tilde{\nabla} \prod(p) \sum_{p \in [0,1]^2} u(x(p))^t \tilde{\nabla} \Pi(p) \tilde{\nabla}^t \prod(p) u(x(p)).$$

This is linear in u so closed-form expressions exist for each of the forms of u, for example, for the unconstrained general spline motion, $$\hat{u}(x(p)) = (\tilde{\nabla} \Pi(p) \tilde{\nabla}^t \Pi(p))^{-1} \dot{I}(p) \tilde{\nabla} \Pi(p). \quad \text{(Equation 36)}$$

This approach can be incorporated into the other embodiments of the present invention for the various possible deformations described herein.

In the situation where large numbers of feature points, curves, and subvolumes are to be automatically generated from the source projection(s) and 3D data (if any), image matching is performed directly on the source imagery or on the fundamental 3D volumes into which the source object can be divided. For the case where the avatar is generated from 2D projective photographic images, the measured target projective image has labeled points, curves, and subregions generated by diffeomorphic image matching. Defining a template projective exemplar face with all of the labeled submanifolds from the avatar, the projective exemplar can be transformed bijectively via the diffeomorphisms onto the target candidate photograph, thereby automatically labeling the target photographs into its constituent submanifolds. Given these submanifolds, the avatars can then be matched or transformed into the labeled photographs. Accordingly, in the image plane a deformation $\phi: x \mapsto \phi(x)$ satisfying $\phi = \int_0^1 v_t(\phi_t(x))dt + x$, $x \in R^2$ is generated. The template and target images $I_0$, $I_1$ are transformed to satisfy $$\min_{v_t, t \in [0,1], z_n} \int_0^1 \|Lv_t\|^2 dt + \sum_{n=1}^N \|I_0 \circ \phi^{-1} - I_1\|^2. \quad \text{(Equation 37)}$$

The given diffeomorphism is applied to labeled points, curves, and areas in the template $I_0$ thereby labeling those points, curves, and areas in the target photograph.

When the target source data are in 3D, the diffeomorphisms are used to define bijective correspondence in the 3D background space, and the matching is performed in the volume rather than in the image plane.

The following techniques may be used to select avatar models automatically. Given a collection of avatar models $\{CAD^a, a=1,2,\ldots\}$, and a set of measured photographs of the face of one individual, the task is to select the avatar model which is most representative of the individual face being analyzed. Let the avatar models be specified via points, curves, surfaces, or subvolumes. Assume for example N feature initial and target points, $x_n^a$, $x_n \in IR^d$, $n=1,\ldots,N$, with $x_n = x_n^a + u(x_n^a)$, one for each avatar $a=1,2,\ldots$.

In one embodiment, the avatar is deformed with small deformations only and no rigid motions. For this embodiment, it is assumed that the measured feature items are all points from a single camera viewing which generated the projected source image in which the feature points were measured. The matching $x_n^a \mapsto x_n^a + u(x_n^a)$, $n=1,\ldots,N$ is constructed and the $CAD^a$ model which is of smallest metric distance is selected. The optimum selected avatar model is the one closest to the candidate in the metric. Any of a variety of distance functions may be used in the selection of the avatar, including the large deformation metric from the diffeomorphism mapping technique described above, the real-time metric described above, the Euclidean metric, and the similitude metric of Kendall. The technique is described herein using the real-time metric. When there is no rigid motion, then the CAD model is selected to minimize the metric based on one or several sets of features from photographs, here described for one photo:

$$CAD^{\hat{a}} = \arg \min_{CAD^a, a=1,2,\ldots} \min_{u, z_n} \|Lu\|^2 + \quad \text{(Equation 38)}$$

$$\sum_{n=1}^N \|(x_n^a + u(x_n^a)) - z_n P_n\|^2$$

$$= \arg \min_{CAD^a, a=1,2,\ldots} \min_u \|Lu\|^2 +$$

$$\sum_{n=1}^N (x_n^a + u(x_n^a))^t Q_n (x_n^a + u(x_n^a)).$$

In other embodiments both metrics including unknown or known rigid motions, large deformation metrics, or affine motions can be used such as described in equations 28 and 29, respectively.

For selecting avatars given 3D information such as features of points, curves, surfaces and or subvolumes in the 3D volume, then the metric is selected which minimizes the distance between the measurements and the family of candidate CAD models. First, the K matrix defining the quadratic form metric measuring the distance is computed:

$$K = \begin{pmatrix} K(x_1^a, x_1^a) & K(x_1^a, x_2^a) & & K(x_1^a, x_N^a)) \\ \vdots & \vdots & \vdots & \vdots \\ K(x_N^a, x_1^a) & K(x_N^a, x_2^a) & & K(x_N^a, x_N^a) \end{pmatrix}; \quad \text{(Equation 39)}$$

K may be, for example, $K(x_i, x_j) = \text{diag}(e^{-\alpha \|x_i - x_j\|})$. Next, the metric between the CAD models and the candidate photographic feature points is computed according to $x_n^a \mapsto x_n^a = A x_n^a + b + u(x_n^a)$, $n=1,\ldots,N$ and $CAD^a$ of small distance is selected. Exact matching or inexact matching ($\sigma = 0$ or inexact $\sigma \neq 0$) can be used:

$$exactCAD^{\hat{a}} = \arg \quad \text{(Equation 40)}$$

$$\min_{CAD^a, a=1,2,\ldots} \min_{A,b} \sum_{ij=1}^N (Ax_i + b - x_i')^t (K^{-1})_{ij} (Ax_j + b - x_j');$$

$$inexact^{\hat{a}} = \quad \text{(Equation 41)}$$

$$\arg \min_{CAD^a, a=1,2,\ldots} \min_{A,b} \sum_{ij=1}^N (Ax_i + b - x_i')^t ((K + \sigma^2 I)^{-1})_{ij}$$

$$(Ax_j + b - x_j').$$

The minimum norm is determined by the error between the CAD model feature points and the photographic feature points.

The present invention may also be used to match to articulated target objects. The diffeomorphism and real-time mapping techniques carry the template 3D representations bijectively onto the target models, carrying all of the information in the template. The template models are labeled with different regions corresponding to different components of the articulated object. For example, in the case of a face, the articulated regions may include teeth, eyebrows, eyelids, eyes, and jaw. Each of these subcomponents can be articulated during motion of the model according to an articulation model specifying allowed modes of articulation. The mapping techniques carry these triangulated subcomponents onto the targets, thereby labeling them with their subcomponents automatically. The resulting selected CAD model therefore has its constituent parts automatically labeled, thereby allowing each avatar to be articulated during motion sequences.

In the case when direct 3D measurement of the source object is available $x_n, y_n \in R^3$, $n=1,\ldots,N$ from points, curves, surfaces, or subvolumes, the techniques for determining the rotation/translation correspondences are unchanged. However, since the matching terms involve direct measurements in the volume, there is no need for the intermediate step to determine the dependence on the unknown z-depth via the MMSE technique.

Accordingly, the best matching rigid motion corresponds to:

$$\min_{O,b} \sum_{n=1}^{N} \|Ox_n + b - y_n\|^2. \quad \text{(Equation 42)}$$

The real-time deformation corresponds to:

$$\min_{u,z_n} \|Lu\|^2 + \sum_{n=1}^{N} \|(x_n + u(x_n)) - y_n\|^2. \quad \text{(Equation 43)}$$

The diffeomorphism deformation corresponds to with $\phi = \int_0^1 v_t(\phi_t(x))dt + x$, $x \in \mathbb{R}^3$:

$$\min_{v_t, t \in [0,1], z_n} \int_0^1 \|Lv_t\|^2 dt + \sum_{n=1}^{N} \|\phi(x_n) - y_n\|^2. \quad \text{(Equation 44)}$$

The techniques described herein also allow for the automated calibration camera parameters, such as the aspect ratio and field of view. The set of $x_j = (x_j, y_j, z_j)$, $j=1, \ldots, N$ features are defined on the CAD model. The positive depth projective geometry mapping with $$\alpha_1 = \frac{1}{\gamma_1}, \alpha_2 = \frac{1}{\gamma_2}$$

is defined, according to $$(x, y, z) \mapsto p(x, y, z) = \left(\frac{x}{\gamma_1 z}, \frac{y}{\gamma_2 z}\right),$$

$z \in [0, \infty)$, $n > 0$. Given are observations of some features through the projective geometry $$p_j = \left(\frac{x_j}{\gamma_2 z_j}, \frac{y_j}{z_j}\right).$$

The calibration of the camera is determined under the assumption that there is no transformation (affine or other) of the avatar. The z value is parameterized by incorporating the n frustrum distance so that all depth coordinates are the above coordinates plus frustrum depth. Videos can show different aspect ratios $$AR = \frac{\alpha_1}{\alpha_2}$$

and fields-of-view $$FOV = 2\tan^{-1}\frac{1}{\alpha_1}.$$

The technique estimates the aspect ratios $\gamma_1, \gamma_2$ from measured points $P_i = (\gamma_1 p_{i1}, \gamma_2 p_{i2}, 1)^t$, $i=1, \ldots, N$:

$$\min_{O, b, \gamma_1, \gamma_2, z_i, i=1, \ldots} \sum_{i=1}^{N} \|Ox_i + b - z_i P_i\|^2 = \quad \text{(Equation 45)}$$

$$\min_{O, b, \gamma_1, \gamma_2} \sum_{i=1}^{N} \|Ox_i + b^2\| - \sum_{i=1}^{N} \frac{|(Ox_i + b)^t P_i|^2}{\|P_i\|^2}.$$

Using the initialization $\gamma_1^{new} = \gamma_2^{new} = 1$, the calculation is run to convergence.

In the first step, the data terms $$P_i = \begin{pmatrix} \gamma_1^{old} p_{i1} \\ \gamma_2^{old} p_{i2} \\ 1 \end{pmatrix}$$

are solved, and the following rotations/translations are computed:

$$Q_i = \left(I - \frac{P_i(P_i)^t}{\|P_i\|^2}\right), \overline{Q} \quad \text{(Equation 46)}$$

$$= \sum_{i=1}^{N} Q_i, X_Q = \sum_{i=1}^{N} Q_i X_i, M_i = X_i - \overline{Q}^{-1} X_Q;$$

$$\hat{O} = \arg\min_O O^t\left(\sum_{i=1}^{N} M_i^t Q_i M_i\right) O, \hat{b} \quad \text{(Equation 47)}$$

$$= -\left(\sum_{i=1}^{N} Q_i\right)^{-1} \sum_{i=1}^{N} Q_i \hat{O} x_i, \psi_i = \begin{pmatrix} (\hat{O}x_i + \hat{b})_1 p_{i1} \\ (\hat{O}x_i + \hat{b})_2 p_{i2} \\ (\hat{O}x_i + \hat{b})_3 \end{pmatrix}.$$

Next, the expression $$\max_{\gamma_1, \gamma_2} -\sum_{i=1}^{N} \frac{|\psi_{1i}\gamma_1 + \psi_{2i}\gamma_2 + \psi_{3i}|^2}{p_{1i}^2 \gamma_1^2 + p_{2i}^2 \gamma_2^2 + 1}$$

is maximized using an optimization method, such as Newton Raphson, gradient or conjugate gradient. Using the gradient algorithm, for example, the calculation is run to convergence, and the first step is repeated. The gradient method is shown here, with step-size selected for stability:

$$\begin{pmatrix} \gamma_1^{new} \\ \gamma_2^{new} \end{pmatrix} = \begin{pmatrix} \gamma_1^{old} \\ \gamma_2^{old} \end{pmatrix} + \partial_\gamma(\gamma^{old}) step - size \quad \text{(Equation 48)}$$

-continued $$\partial_{\gamma_1} = \sum_{n=1}^{N} 2\psi_{i1} \frac{\psi_{i1}\gamma_1 + \psi_{i2}\gamma_2 + \psi_{i3}}{(p_{i1}^2\gamma_1^2 + p_{i2}^2\gamma_2^2 + 1)^2} - \sum_{n=1}^{N} 2p_{i1} \frac{(\psi_{i1}\gamma_1 + \psi_{i2}\gamma_2 + \psi_{i3})^2}{(p_{i1}^2\gamma_1^2 + p_{i2}^2\gamma_2^2 + 1)^2}$$ (Equation 49)

$$\partial_{\gamma_2} = \sum_{n=1}^{N} 2\psi_{i2} \frac{\psi_{i1}\gamma_1 + \psi_{i2}\gamma_2 + \psi_{i3}}{(p_{i1}^2\gamma_1^2 + p_{i2}^2\gamma_2^2 + 1)^2} - \sum_{n=1}^{N} 2p_{i2} \frac{(\psi_{i1}\gamma_1 + \psi_{i2}\gamma_2 + \psi_{i3})^2}{(p_{i1}^2\gamma_1^2 + p_{i2}^2\gamma_2^2 + 1)^2}.$$ (Equation 50)

The techniques described herein may be used to compare a source 3D object to a single reference object. 2D representations of the source object and the reference object are created, and the correspondence between them is characterized using mathematical optimization and projective geometry. Typically, the correspondence is characterized by specifying the viewpoint from which the 2D source projection was captured.

Figure 4:
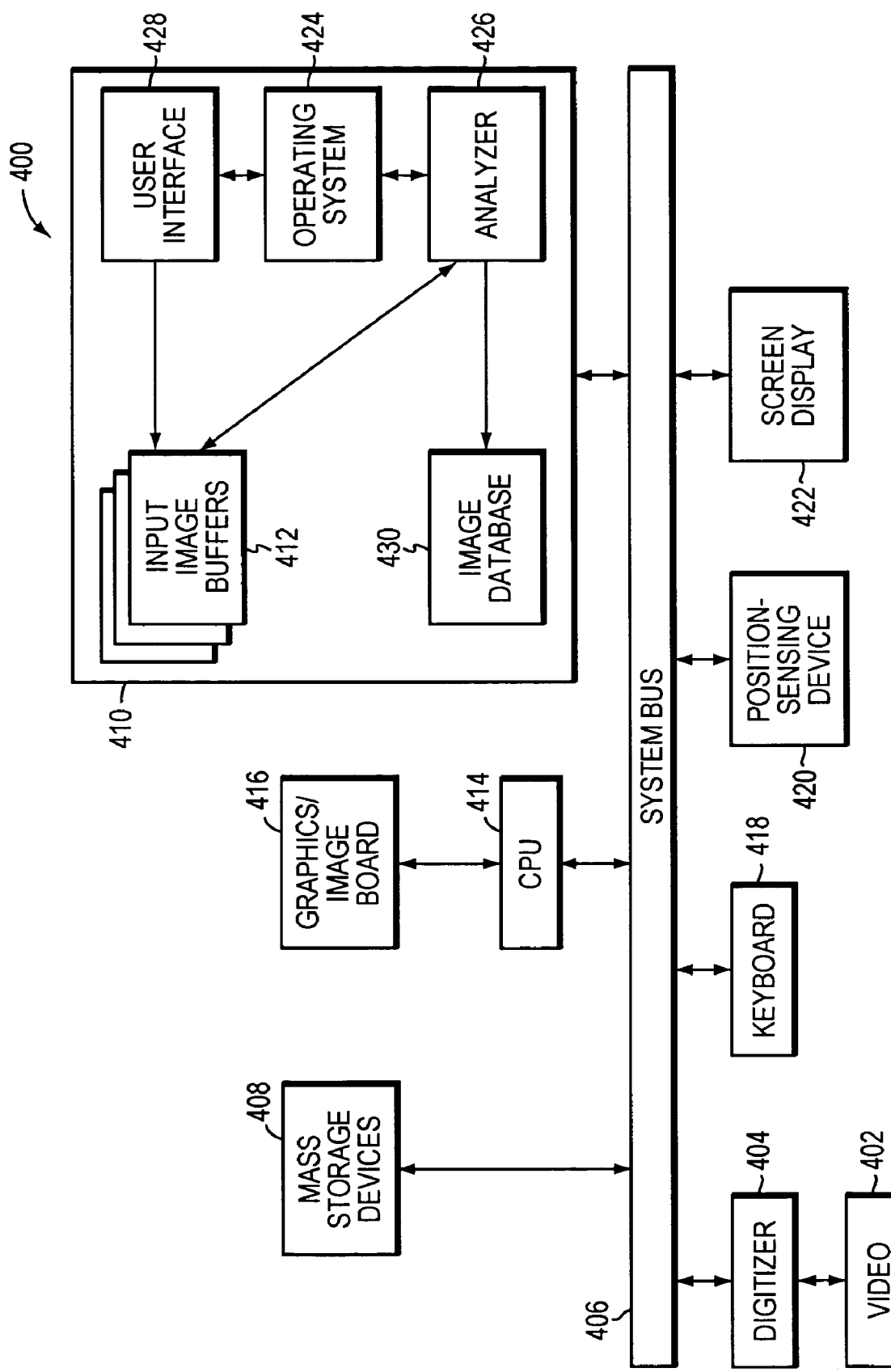
FIG. 4 is a block diagram showing a representative hardware environment for the present invention.

Refer now to FIG. 4, which illustrates a hardware system 400 incorporating the invention. As indicated therein, the system includes a video source 402 (e.g., a video camera or a scanning device) which supplies a still input image to be analyzed. The output of the video source 402 is digitized as a frame into an array of pixels by a digitizer 404. The digitized images are transmitted along the system bus 406 over which all system components communicate, and may be stored in a mass storage device (such as a hard disc or optical storage unit) 408 as well as in main system memory 410 (specifically, within a partition defining a series of identically sized input image buffers) 412.

The operation of the illustrated system is directed by a central-processing unit ("CPU") 414. To facilitate rapid execution of the image-processing operations hereinafter described, the system preferably contains a graphics or image-processing board 416; this is a standard component well-known to those skilled in the art.

The user interacts with the system using a keyboard 418 and a position-sensing device (e.g., a mouse) 420. The output of either device can be used to designate information or select particular points or areas of a screen display 420 to direct functions performed by the system.

The main memory 410 contains a group of modules that control the operation of the CPU 414 and its interaction with the other hardware components. An operating system 424 directs the execution of low-level, basic system functions such as memory allocation, file management and operation of mass storage devices 408. At a higher level, the analyzer 426, implemented as a series of stored instructions, directs execution of the primary functions performed by the invention, as discussed below; and instructions defining a user interface 428 allow straightforward interaction over screen display 422. The user interface 428 generates words or graphical images on the display 422 to prompt action by the user, and accepts commands from the keyboard 418 and/or position-sensing device 420. Finally, the memory 410 includes a partition 430 for storing for storing a database of 3D reference avatars, as described above.

The contents of each image buffer 412 define a "raster," i.e., a regular 2D pattern of discrete pixel positions that collectively represent an image and may be used to drive (e.g., by means of image-processing board 416 or an image server) screen display 422 to display that image. The content of each memory location in a frame buffer directly governs the appearance of a corresponding pixel on the display 422.

It must be understood that although the modules of main memory 410 have been described separately, this is for clarity of presentation only; so long as the system performs all the necessary functions, it is immaterial how they are distributed within the system and the programming architecture thereof. Likewise, though conceptually organized as grids, pixelmaps need not actually be stored digitally in this fashion. Rather, for convenience of memory utilization and transmission, the raster pattern is usually encoded as an ordered array of pixels.

Figure 5:
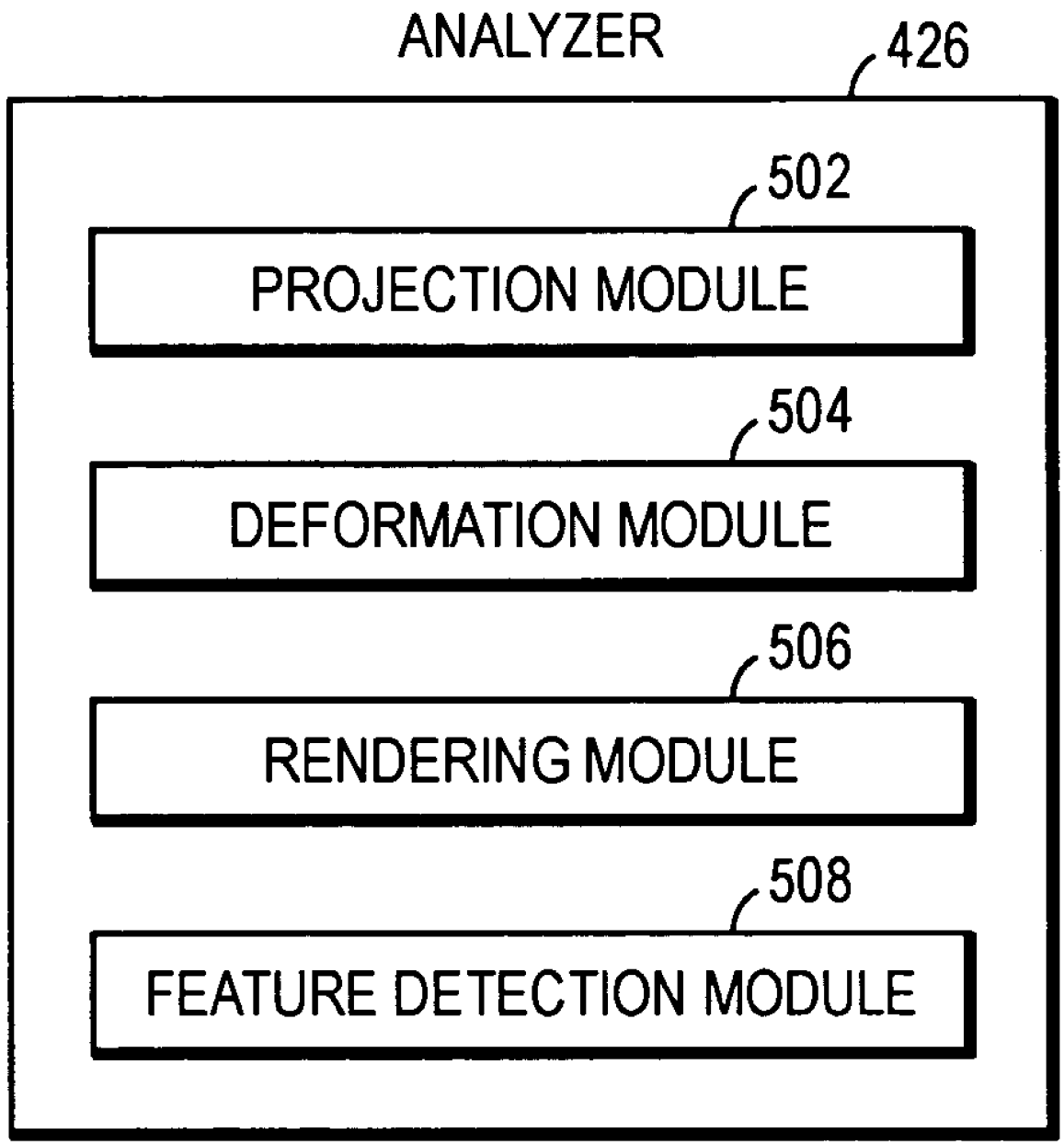
FIG. 5 is a block diagram showing components of the analyzer illustrated in FIG. 4.

As noted above, execution of the key tasks associated with the present invention is directed by the analyzer 426, which governs the operation of the CPU 414 and controls its interaction with main memory 410 in performing the steps necessary to match and deform reference 3D representations to match a target multifeatured object. FIG. 5 illustrates the components of a preferred implementation of the analyzer 426. The projection module 502 takes a 3D model and makes a 2D projection of it onto any chosen plane. In general, an efficient projection module 502 will be required in order to create numerous projections over the space of rotations and translations for each of the candidate reference avatars. The deformation module 504 performs one or more types of deformation on an avatar in order to make it more closely resemble the source object. The deformation is performed in 3D space, with every point defining the avatar mesh being free to move in order to optimize the fit to the conditional mean estimates of the reverse projected feature items from the source imagery. In general, deformation is only applied to the best-fitting reference object, if more than one reference object is supplied. The rendering module 506 allows for the rapid projection of a 3D avatar into 2D with the option of including the specification of the avatar lighting. The 2D projection corresponds to the chosen lighting of the 3D avatar. The feature detection module 508 searches for specific feature items in the 2D source projection. The features may include eyes, nostrils, lips, and may incorporate probes that operate at several different pixel scales.

Figure 6:
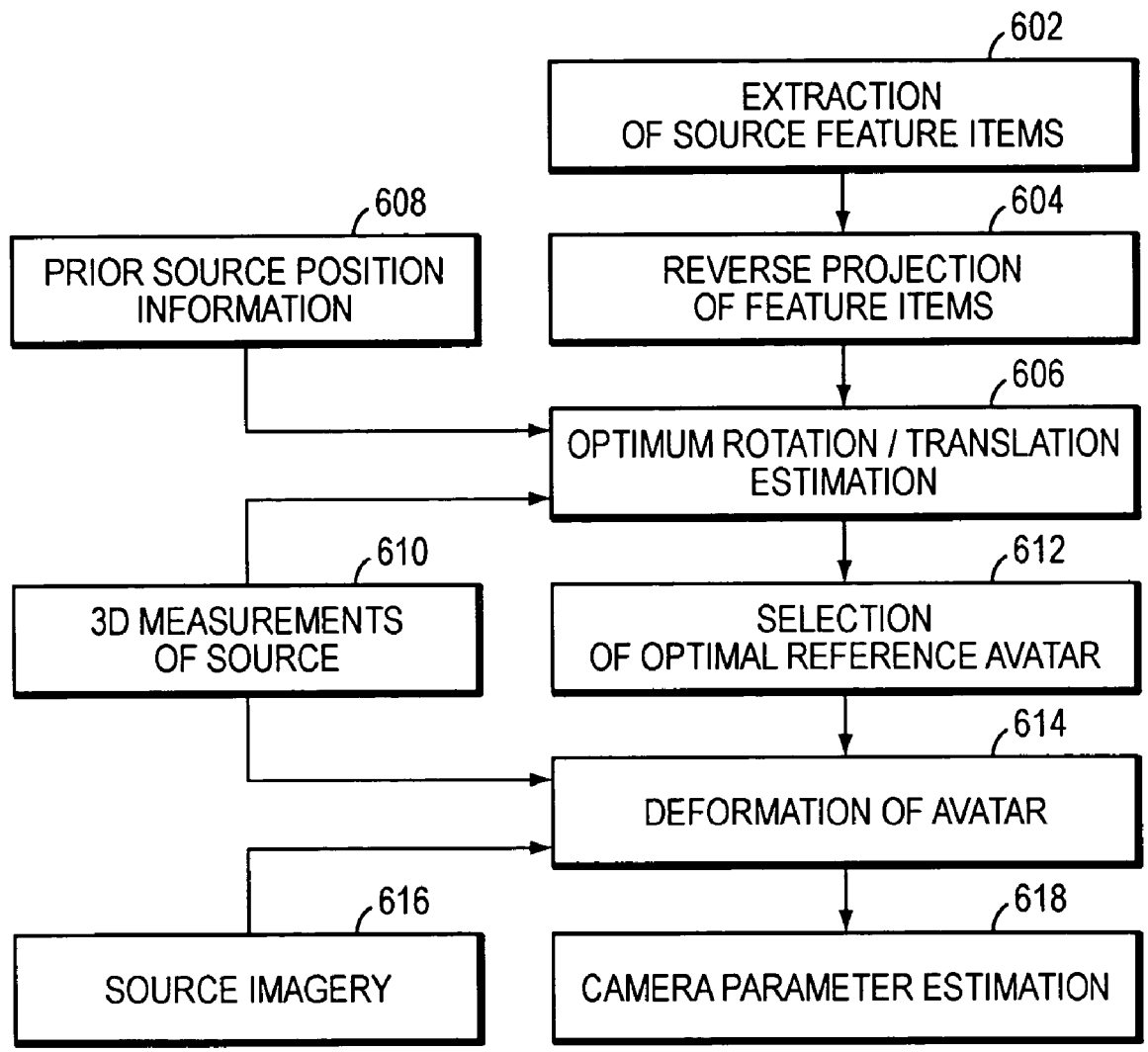
FIG. 6 is a block diagram showing the key functions performed by the analyzer.

FIG. 6 illustrates the functions of the invention performed in main memory. In step 602, the system examines the source imagery and automatically detects features of a face, such as eyeballs, nostrils, and lips that can be used for matching purposes, as described above. In step 604, the detected feature items are reverse projected into the coordinate frame of the candidate avatar, as described above and using equation 7. In step 606, the optimum rotation/translation of the candidate avatar is estimated using the techniques described above and using equations 8, 9 and 10. In step 608, any prior information that may be available about the position of the source object with respect to the available 2D projections is added into the computation, as described herein using equations 11-13. When 3D measurements of the source are available, this data is used to constrain the rigid motion search as shown in step 610 and as described above with reference to equations 41-43. When the rotation/translation search 606 is completed over all the reference 3D avatars, the best-fitting avatar is selected in step 612, as described above, with reference to equations 38-40. Subsequently, the best-fitting avatar located in step 612 is deformed in step 614. 3D measurements of the source object 610, if any, are used to constrain the deformation 614. In addition, portions of the source imagery 616 itself may be used to influence the deformation 614.

The invention provides for several different kinds of deformation which may be optionally applied to the best-fitting reference avatar in order to improve its correspondence with the target object. The deformations may include real-time deformation without rigid motions in which a closed form expression is found for the deformation, as described above using equations 18, 19. A diffeomorphic deformation of the avatar with no rigid motions may be applied (equations 22-24). Alternatively, a real time deformation with unknown rigid motion of the avatar may be deployed (equations 28, 29). A real-time diffeomorphic deformation may be applied to the avatar by iterating the real-time deformation. The avatar may be deformed using affine motions (equations 30, 31). The deformation of the avatar may be guided by matching a projection to large numbers of feature items in the source data, including the identification of submanifolds within the avatar, as described above with reference to equation 37. When the target object is described by an articulated model, the deformations described above may be applied to each articulated component separately.

The invention enables camera parameters, such as aspect ratio and field of view to be estimated as shown in step 618 and described above, with reference to equations 44-49.

As noted previously, while certain aspects of the hardware implementation have been described for the case where the target object is a face and the reference object is an avatar, the invention is not limited to the matching of faces, but may be used for matching any multifeatured object using a database of reference 3D representations that correspond to the generic type of the target object to be matched.

It will therefore be seen that the foregoing represents a highly extensible and advantageous approach to the generation of 3D models of a target multifeatured object when only partial information describing the object is available. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A method involving at least one source 2D projection of a source multifeatured object and a reference library of 3D reference objects, the method comprising:
   a. providing a plurality of reference 3D representations, each of the plurality of reference 3D representations representing a corresponding different member of the library of 3D reference objects; and
   b. searching over rigid motions and deformations of the plurality of reference 3D representations to identify a best match reference 3D representation having a 2D projection most resembling the at least one source 2D projection,
   wherein said searching involves selecting each reference 3D representation among the plurality of reference 3D representations and for each selected reference 3D representation applying both rigid motion and deformation operators to that selected reference 3D representation to generate multiple versions of that selected reference 3D representation, and for each version of that selected reference 3D representation, computing a measure of fit between that version of that selected 3D representation and the at least one source 2D projection, and
   wherein the best-fit 3D representation is the version of the reference 3D representation from the plurality of reference 3D representations that yields a best measure of fit.

2. The method of claim 1 wherein searching over rigid motions and deformations comprises computing a rigid motion and deformation of the best match reference 3D representation that is optimally consistent with a viewpoint of the source multifeatured object in the at least one source 2D projection.

3. The method of claim 2, further comprising generating a 3D representation of the source multifeatured object by applying the optimum rigid motion and deformation to the best match reference 3D representation.

4. The method of claim 2 wherein the reference 3D representations comprise feature items and the optimum rigid motion and deformation is determined by:
   a. estimating a conditional mean of the feature items in a 3D coordinate space associated with the reference 3D representations, which feature items are projectionally consistent with corresponding feature items in the at least one source 2D projection; and
   b. generating, for rigid motions and deformations of the reference 3D representations, minimum mean-squared error estimates between the conditional mean estimate of the feature items and corresponding feature items of the reference 3D representation.

5. The method of claim 4 wherein the corresponding feature items in the at least one source 2D projection are generated by using dynamic programming.

6. The method of claim 4 wherein the feature items in the at least one source 2D projection are found automatically by using correspondences between the at least one source projection and projected imagery of one of the reference 3D objects.

7. The method of claim 4 wherein automatic camera calibration is performed by comparing feature items in the best match reference 3D representation with corresponding feature items in the at least one source projection, the at least one source projection being captured by the camera.

8. The method of claim 2 wherein the rigid motions comprise pitch, roll, yaw, and translation in three dimensions.

9. The method of claim 1 wherein resemblance is determined by a degree of alignment between feature items in the 3D representations and corresponding feature items in the at least one source 2D projection.

10. The method of claim 1 further comprising constraining the rigid motion based on known 3D position information associated with the at least one source 2D projection.

11. The method of claim 1 further comprising the step of applying a transformation to the best match reference 3D representation, the transformation causing the best match 3D reference representation to more closely resemble the source multifeatured object.

12. The method of claim 11 wherein the best match 3D representation is transformed using large deformation diffeomorphisms, thereby preserving the geometry and topology of the reference 3D representation.

13. The method of claim 11 wherein the transformation enforces constraints on the symmetry of the reference 3D representation.

14. The method of claim 11 wherein the transformation comprises aligning feature items in the at least one source 2D projection with corresponding feature items in the best-match reference 3D representation.

15. The method of claim 11 wherein the transformation comprises optimizing a match between the projection of a plurality of points on the best match reference 3D representation and the at least one source 2D projection.

16. The method of claim 11 wherein the transformation occurs without rigid motions.

17. The method of claim 11 wherein the transformation includes affine motions.

18. The method of claim 11 wherein the transformation is constrained by at least one of known 3D position information associated with at least one source 2D projection, and 3D data of the source multifeatured object obtained from a measuring device that captures data in 3D.

19. The method of claim 11 wherein the transformation is performed using a closed form expression.

20. The method of claim 11 wherein the transformation is performed substantially in real time.

21. The method of claim 1 wherein searching over rigid motions and deformations involves simultaneously searching over rigid motions and deformations of the plurality of reference 3D representations.

22. The method of claim 1 wherein applying both rigid motion and deformation operators to each of the selected reference 3D representations involves simultaneously applying both rigid motion and deformation operators to each of the selected reference 3D representations.

23. The method of claim 1 wherein computing a measure of fit between that version of that selected 3D representation and the at least one source 2D projection involves computing a measure of fit between a 2D projection of that version of that selected 3D representation and the at least one source 2D projection.

24. The method of claim 1 wherein the 3D reference objects in the library and the reference 3D representations among the plurality of reference 3D representations are avatars.

25. A system involving at least one source 2D projection of a source multifeatured object and a reference library of 3D reference objects, the system comprising:
   a. a database storing a plurality of reference 3D representations of multifeatured objects, each of the plurality of reference 3D representations representing a corresponding different member of the library of 3D reference objects; and
   b. an analyzer programmed to search over rigid motions and deformations of the plurality of reference 3D representations to identify a best match reference 3D representation having a 2D projection most resembling the at least one source 2D projection, wherein the analyzer is programmed to search over rigid motions and deformations by:
   selecting each reference 3D representation among the plurality of reference 3D representations and for each selected reference 3D representation applying both rigid motion and deformation operators to that selected reference 3D representation to generate multiple versions of that selected reference 3D representation, and for each version of that selected reference 3D representation, computing a measure of fit between that version of that selected 3D representation and the at least one source 2D projection,
   wherein the best-fit 3D representation is the version of the reference 3D representation from the plurality of reference 3D representations that yields a best measure of fit.

26. The system of claim 25 wherein the analyzer is programmed to further compute a rigid motion and deformation of the best match reference 3D representation that is optimally consistent with a viewpoint of the source multifeatured object in the at least one source 2D projection.

27. The system of claim 26, wherein the analyzer is further configured to generate a 3D representation of the source multifeatured object by applying the optimum rigid motion and deformation to the best match 3D representation.

28. The system of claim 26 wherein the reference 3D representations comprise feature items and the analyzer is programmed to determine the optimum rigid motion and deformation by:
   a. estimating a conditional mean of the feature items in a 3D coordinate space associated with the reference 3D representations which feature items are projectionally consistent with corresponding feature items in the at least one source 2D projection; and
   b. generating, for rigid motions and deformations of the reference 3D representations minimum mean-squared error estimates between the conditional mean estimate of the feature items and corresponding feature items of the reference 3D representation.

29. The system of claim 28 wherein the corresponding feature items in the at least one source 2D projection are generated by using dynamic programming.

30. The system of claim 28 wherein the feature items in the at least one source 2D projection are found automatically by using correspondences between the at least one source projection and projected imagery of one of the reference 3D objects.

31. The system of claim 28 wherein the analyzer is further configured to perform automatic camera calibration by comparing feature items in the best match reference 3D representation with corresponding feature items in the at least one source projection, the at least one source projection being captured by the camera.

32. The system of claim 26 wherein the rigid motions comprise pitch, roll, yaw, and translation in three dimensions.

33. The system of claim 25 wherein resemblance is determined by a degree of alignment between feature items in the 3D representations and corresponding feature items in the at least one source 2D projection.

34. The system of claim 25 wherein the analyzer constrains the searched rigid motions to include only rigid motions based on known 3D position information associated with the at least one source 2D projection.

35. The system of claim 25 further comprising a deformation module for applying a transformation to the best match reference 3D representation, the transformation causing the best match 3D reference representation to more closely resemble the source multifeatured object.

36. The system of claim 35 wherein the deformation module transforms the best match 3D representation using large deformation diffeomorphisms, thereby preserving the geometry and topology of the reference 3D representation.

37. The system of claim 35 wherein the deformation module enforces constraints on the symmetry of the transformed best match reference 3D representation.

38. The system of claim 35 wherein the deformation module transforms best match reference 3D representation so that feature items in the at least one source 2D projection align with corresponding feature items in the best match reference 3D representation.

39. The system of claim 35 wherein the deformation module transforms the best match reference 3D representation to optimize a match between the projection of a plurality of points on the best match reference 3D representation and the at least one source 2D projection.

40. The system of claim 35 wherein the deformation module does not use rigid motions.

41. The system of claim 35 wherein the deformation module uses affine motions.

42. The system of claim 35 wherein operation of the deformation module is constrained by at least one of known 3D position information associated with at least one source 2D projection, and 3D data of the source multifeatured object obtained from a measuring device that captures data in 3D.

43. The system of claim 35 wherein the deformation module operates in accordance with a closed-form expression.

44. The system of claim 35 wherein the deformation module performs the transformation substantially in real time.

45. The system of claim 25 wherein the analyzer is programmed to simultaneously searching over rigid motions and deformations of the plurality of reference 3D representations.

46. The system of claim 25 wherein the analyzer is programmed to search over rigid motions and deformations by simultaneously applying both rigid motion and deformation operators to each of the selected reference 3D representations.

47. The system of claim 25 wherein the analyzer is programmed to compute a measure of fit between that version of that selected 3D representation and the at least one source 2D projection by computing a measure of fit between a 2D projection of that version of that selected 3D representation and the at least one source 2D projection.

48. The system of claim 25 wherein the 3D reference objects in the library and the reference 3D representations among the plurality of reference 3D representations are avatars.

* * * * *

UNITED STATES PATENT AND TRADEMARK OFFICE
CERTIFICATE OF CORRECTION

PATENT NO. : 7,643,685 B2  Page 1 of 1
APPLICATION NO. : 10/794353
DATED : January 5, 2010
INVENTOR(S) : Michael Miller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this

Twenty-first Day of December, 2010

David J. Kappos
*Director of the United States Patent and Trademark Office*